(12) United States Patent
Daum

(10) Patent No.: US 9,233,680 B2
(45) Date of Patent: Jan. 12, 2016

(54) SYSTEM AND METHOD FOR CONTROLLING A VEHICLE SYSTEM

(71) Applicant: General Electric Company, Schenectady, NY (US)

(72) Inventor: Wolfgang Daum, Erie, PA (US)

(73) Assignee: General Electric Company, Schenectady, NY (US)

( * ) Notice: Subject to any disclaimer, the term of this patent is extended or adjusted under 35 U.S.C. 154(b) by 320 days.

(21) Appl. No.: 13/721,237

(22) Filed: Dec. 20, 2012

(65) Prior Publication Data

US 2014/0180511 A1  Jun. 26, 2014

(51) Int. Cl.
*B60W 20/00* (2006.01)
*B60W 10/08* (2006.01)
*B60W 10/06* (2006.01)

(52) U.S. Cl.
CPC .............. *B60W 20/00* (2013.01); *B60W 10/06* (2013.01); *B60W 10/08* (2013.01); *Y02T 10/6286* (2013.01); *Y10S 903/93* (2013.01)

(58) Field of Classification Search
None
See application file for complete search history.

(56) References Cited

U.S. PATENT DOCUMENTS

| 5,561,602 | A * | 10/1996 | Bessler et al. ................... 701/1 |
| 2005/0109882 | A1 * | 5/2005 | Armbruster et al. ...... 246/167 R |
| 2008/0125924 | A1 * | 5/2008 | Daum et al. .................... 701/19 |
| 2008/0246338 | A1 * | 10/2008 | Donnelly et al. ............... 307/54 |

* cited by examiner

*Primary Examiner* — John R Olszewski
*Assistant Examiner* — Nicholas K Wiltey
(74) *Attorney, Agent, or Firm* — GE Global Patent Operation; John A. Kramer

(57) ABSTRACT

A method for controlling a vehicle system includes determining when the vehicle system approaches an airflow restricted area and distributing a total power output of the vehicle system among first and second vehicles of the vehicle system. The total power output is distributed by directing the first vehicle to decrease power output relative to a power output generated by the second vehicle and/or by directing the second vehicle to increase power output relative to the power output generated by the first vehicle. The method includes monitoring the power output of the second vehicle during travel of the vehicle system in the airflow restricted area to determine when the second vehicle derates and redistributing the total power output of the vehicle system among the at vehicles as the vehicle system travels in the airflow restricted area and responsive to the second vehicle derating.

29 Claims, 6 Drawing Sheets

SYSTEM AND METHOD FOR CONTROLLING A VEHICLE SYSTEM

TECHNICAL FIELD

Embodiments of the subject matter described herein relate to controlling operations of a vehicle system.

BACKGROUND

Some known vehicle systems include multiple vehicles connected together so that the vehicles can travel together. Such vehicle systems can be referred to as consists. For example, rail vehicle consists may include two or more locomotives and one or more railcars connected together. The vehicle systems may have engines that consume fuel and air (e.g., oxygen) to generate propulsive force and travel in open areas having sufficient oxygen supply and ventilation to allow engines of the vehicle systems to provide full power output (e.g., for the horsepower ratings of the engines).

However, these vehicle systems also may travel through areas where there is insufficient oxygen supply and/or ventilation. For example, during travel in a tunnel, there may an insufficient supply of oxygen available for combustion by the engines of the vehicle systems. If one or more vehicles having the engines are traveling behind one or more other vehicles generating exhaust, the engines in the trailing vehicles may intake the exhaust into the engines instead of oxygen. As a result of the decreased oxygen and/or intake of exhaust, the engines may overheat and/or produce less power. For example, the operating temperatures of the engines may increase such that the vehicles automatically decrease the output of the engines.

Some other known vehicle systems are electric vehicles powered by electric current. These systems may be powered by an onboard energy storage source (e.g., batteries) and/or off-board sources of current (e.g., catenaries and/or powered rails). However, the electric circuits can require airflow in order to cool components of the circuits (e.g., inverters, transformers, and the like). Without sufficient airflow, components of the circuits can overheat over time. For example, during travel in a tunnel, there may insufficient airflow to adequately cool transformers, inverters, and the like of the circuits onboard the vehicles. As a result of the restricted airflow, the power output of the vehicles and/or time during which the vehicles may operate can be limited.

The decrease in power generated by the engines can cause the vehicle system to slow down and/or stop in the tunnel. Additionally, the length of tunnels may be limiting due to the inability of the engines and/or circuits to operate for extended periods of time within the tunnels. A need exists for methods and systems for controlling vehicle systems in tunnels or other areas where airflow is limited so that the vehicle systems travel through the tunnels faster and/or without stalling.

BRIEF DESCRIPTION

In one embodiment, a method (e.g., for controlling a vehicle system traveling along a route that includes an airflow restricted area) includes determining when the vehicle system is approaching an entrance to the airflow restricted area. The vehicle system includes at least first and second propulsion-generating vehicles interconnected with each other. This determination may be made by one or more devices disposed onboard a propulsion-generating vehicle or another, non-propulsion generating vehicle of the vehicle system. The method also includes distributing a total power output of the vehicle system among at least the first and second propulsion-generating vehicles as the vehicle system approaches the entrance of the airflow restricted area. The total power output is distributed by at least one of directing the first propulsion-generating vehicle to decrease power output generated by the first propulsion-generating vehicle relative to a power output generated by the second propulsion-generating vehicle or directing the second propulsion-generating vehicle to increase the power output generated by the second propulsion-generating vehicle relative to the power output generated by the first propulsion-generating vehicle.

The total power may be distributed such that the speed of the vehicle system does not fall below and/or is not predicted to fall below a designated speed threshold. For example, based on the size (e.g., length and/or weight) of the vehicle system, the grade and/or curvature of the route, and/or other factors, a minimum total power threshold may be designated as being necessary to propel the vehicle system through the airflow restricted area. This total power threshold can increase for increasing sizes of the vehicle system and/or inclined grades of the route, and may decrease for decreasing sizes of the vehicle system and/or declined grades of the route. The total power output that is distributed may be kept above the total power threshold so that the vehicle system travels at least as fast as the speed threshold in the airflow restricted area.

The method further includes monitoring the power output generated by the second propulsion-generating vehicle during travel of the vehicle system in the airflow restricted area to determine when the second propulsion-generating vehicle derates and redistributing the total power output of the vehicle system among the at least the first and second propulsion-generating vehicles as the vehicle system travels in the airflow restricted area and responsive to the second propulsion-generating vehicle derating. The distributing and redistributing of the total power output of the vehicle system causes the vehicle system to travel through and exit from the airflow restricted area at least one of within a designated time period, with at least a designated speed, or with at least a designated power output.

In one embodiment, a control system (e.g., for controlling operations of a vehicle system) is provided. The control system includes a location unit that is configured to determine when a vehicle system is approaching an entrance to an airflow restricted area. The vehicle system has at least first and second propulsion-generating vehicles that are interconnected with each other.

One or more components of the control system may be disposed onboard one or more of the propulsion-generating vehicles, onboard a non-propulsion generating vehicle of the vehicle system, or off board of the vehicle system. The control system also includes an allocation unit configured to distribute a total power output of the vehicle system among at least the first and second propulsion-generating vehicles in response to determining that the vehicle system is approaching the entrance to the airflow restricted area. The total power output is distributed by at least one of directing the first propulsion-generating vehicle to decrease a power output generated by the first propulsion-generating vehicle relative to a power output that is generated by the second propulsion-generating vehicle or directing the second propulsion-generating vehicle to reduce a power output generated by the second propulsion-generating vehicle relative to the power output generated by the first propulsion-generating vehicle. The control system also includes a monitoring unit configured to determine when the second propulsion-generating vehicle derates during travel of the vehicle system in the airflow restricted area based on one or more decreases in the power output generated by the second propulsion-generating vehicle. The allocation unit also configured to redistribute the total power output of the vehicle system among at least the first and second propulsion-generating vehicles as the vehicle system travels in the airflow restricted area and responsive to the monitoring unit determining that the power output generated the second propulsion-generating vehicle is derating. The allocation unit is configured to distribute and redistribute the total power output of the vehicle system such that the vehicle system travels through and exit from the airflow restricted area within a designated time period.

In one embodiment, a system (e.g., for controlling a vehicle system) includes a first control system configured to be disposed onboard a first propulsion-generating vehicle of the vehicle system and a second control system configured to be disposed onboard a second propulsion-generating vehicle of the vehicle system. The first and second propulsion-generating vehicles are interconnected with each other in the vehicle system. The first control system is configured to determine when the vehicle system is approaching an entrance to an airflow restricted area and to distribute a total power output of the vehicle system among the first and second propulsion-generating vehicles in response thereto. The total power output is distributed by the first control system decreasing a power output generated by the first propulsion-generating vehicle and by directing the second control system to maintain a power output generated by the second propulsion-generating vehicle above the power output generated by the first propulsion-generating vehicle. At least one of the first or second control system is configured to determine when the power output generated by the second propulsion-generating vehicle decreases due to derating of a propulsion system of the second propulsion-generating vehicle during travel of the vehicle system in the airflow restricted. The first control system also is configured to redistribute the total power output of the vehicle system among the first and second propulsion-generating vehicles as the vehicle system travels in the airflow restricted area and responsive to determining that the power output generated the second propulsion-generating vehicle is decreasing due to derating of the propulsion system. The first control system is configured to distribute and redistribute the total power output of the vehicle system such that the vehicle system travels through and exit from the airflow restricted area within a designated time period.

It is to be understood that the components of the systems and methods described herein that determine when the vehicle system approaches an entrance and/or exit of an airflow restricted area, the total power output to be distributed among the propulsion-generating vehicles, how the total power output is distributed (e.g., split up) among the propulsion-generating vehicles, and the like, may be disposed onboard a propulsion-generating vehicle that leads (e.g., travels ahead of) one or more other propulsion-generating vehicles, onboard a propulsion-generating vehicle that trails (e.g., travels behind) one or more other propulsion-generating vehicles, onboard a non-propulsion generating vehicle, or off-board of the vehicle system.

Additionally or alternatively, the distribution of the total power output may be performed among groups (e.g., consists) of the propulsion-generating vehicles. For example, the total power output may be divided up between at least a first (e.g., leading) group of two or more propulsion-generating vehicles and a second (e.g., trailing) group of two or more propulsion-generating vehicles. The groups may be separated from each other by one or more non-propulsion generating vehicles. In one embodiment, the groups of propulsion-generating vehicles may be spaced sufficiently far apart that distribution of the total power output between the groups may permit one of the groups that is not disposed in the airflow restricted area to assist in pushing or pulling another of the groups that is disposed in the airflow restricted area. For example, when a leading group of propulsion-generating vehicles is disposed in the airflow restricted area but a trailing group of propulsion-generating vehicles is not, the total power output of the vehicle system may be distributed such that the leading group decreases its total power output and the trailing group increases its total power output and the trailing group pushes the leading group through the airflow restricted area. When the leading group exits and the trailing group enters the airflow restricted area, the power output of the leading group can be increased and the power output of the trailing group decreased such that the leading group pulls the trailing group through the airflow restricted area.

In one embodiment, a method (e.g., for controlling a vehicle system) includes determining when a vehicle system traveling along a route is approaching an entrance to an airflow restricted area. The vehicle system includes at least first and second propulsion-generating vehicles that are interconnected with each other. The method also includes, as the vehicle system approaches the entrance of the airflow restricted area, at least one of directing the first propulsion-generating vehicle to decrease power output generated by the first propulsion-generating vehicle relative to a power output generated by the second propulsion-generating vehicle or directing the second propulsion-generating vehicle to increase the power output generated by the second propulsion-generating vehicle relative to the power output generated by the first propulsion-generating vehicle. The method further includes determining when the second propulsion-generating vehicle derates during travel of the vehicle system in the airflow restricted area and, as the vehicle system travels in the airflow restricted area and responsive to the second propulsion-generating vehicle derating, changing the respective power outputs generated by the first and second propulsion-generating vehicles to cause the vehicle system to travel through and exit from the airflow restricted area at least one of within a designated time period, with at least a designated speed, within a designated speed range, with at least a designated power output, or within a designated power output range.

BRIEF DESCRIPTION OF THE DRAWINGS

The subject matter described herein will be better understood from reading the following description of non-limiting embodiments, with reference to the attached drawings, wherein below.

DETAILED DESCRIPTION

Figure 1:
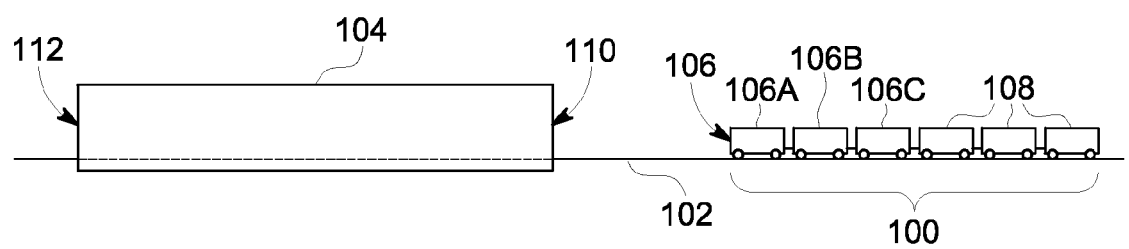
FIG. 1 illustrates a schematic diagram of one example of a vehicle system traveling along a route toward an airflow restricted area.
Figure 4:
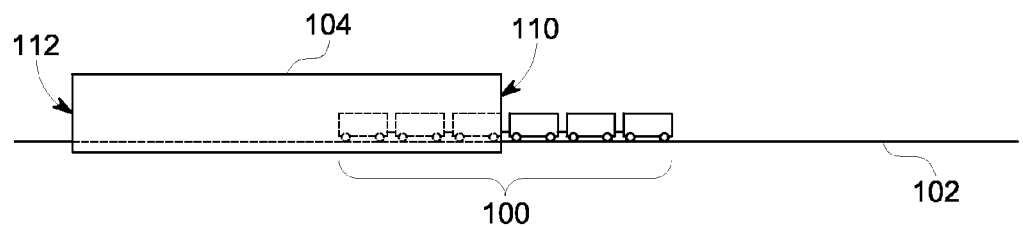
FIG. 4 illustrates a diagram of the vehicle system shown in FIG. 1 entering the airflow restricted area.
Figure 5:
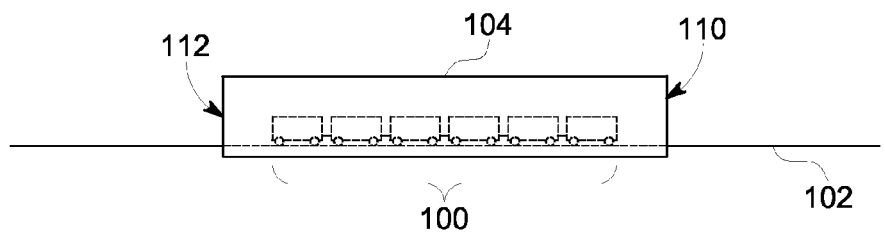
FIG. 5 illustrates a diagram of the vehicle system shown in FIG. 1 traveling in the airflow restricted area.
Figure 6:
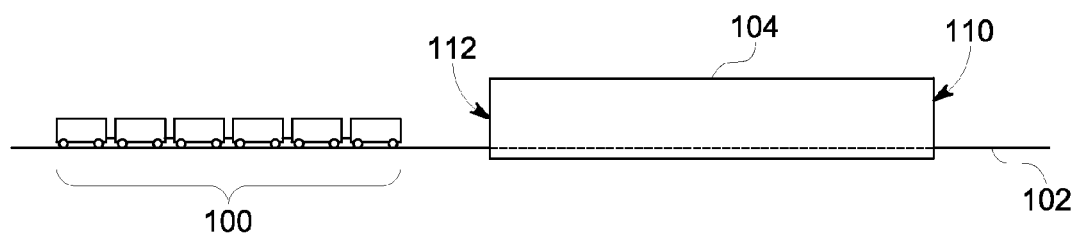
FIG. 6 illustrates a diagram of the vehicle system shown in FIG. 1 exiting from the airflow restricted area.

FIG. 1 illustrates a schematic diagram of one example of a vehicle system 100 traveling along a route 102 toward an airflow restricted area 104. FIGS. 4 through 6 illustrate additional diagrams of the vehicle system 100 entering, traveling within, and exiting from the airflow restricted area 104. The vehicle system 100 includes several vehicles 106, 108 connected with each other, such as by couplers. The vehicles 106 (e.g., vehicles 106A-C) represent propulsion-generating vehicles, such as vehicles capable of generating propulsive force to propel the vehicle system 100 along the route 102. Although the vehicles 106A-C are shown as being directly coupled with each other, two or more of the vehicles 106A-C may be separated from one another by one or more of the vehicles 108. Examples of propulsion-generating vehicles 106 include locomotives, other off-highway vehicles (e.g., vehicles that are not designed for or permitted to travel on public roadways), automobiles (e.g., vehicles that are designed for traveling on public roadways), marine vessels, and the like. The vehicles 108 represent non-propulsion-generating vehicles, such as rail cars or other units that are propelled along the route 102 by the propulsion-generating vehicles 106. The group of vehicles 106 can represent a vehicle consist. While three propulsion-generating vehicles 106 and three non-propulsion generating vehicles 108 are shown, alternatively, a smaller or greater number of the vehicles 106 and/or the vehicles 108 may be provided.

One or more of the propulsion-generating vehicles 106 can include propulsion systems having engines that consume fuel and air to generate electric current to power one or more traction motors to generate propulsive force and/or engines that consume fuel and air to rotate a shaft to rotate axles and wheels to generate propulsive force. Additionally or alternatively, one or more of the propulsion-generating vehicles 106 can be electric powered vehicles that power one or more traction motors with an onboard source of electric energy (e.g., a battery) and/or an off-board source of electric energy (e.g., a catenary or powered rail) to generate propulsive force (instead of generating current from an engine-generator or engine-alternator set). Additionally or alternatively, one or more of the propulsion-generating vehicles 106 can include hybrid propulsion systems that include motors powered by both fuel-consuming engines and electric energy.

The airflow restricted area 104 represents a volume of space through which the route 102 extends and through which the vehicle system 100 travels when traversing the route 102. The volume represented by the airflow restricted area 104 has a reduced supply of oxygen relative to locations that are outside (e.g., immediately outside or in the vicinity of the area 104). By way of example, the airflow restricted area 104 may represent a tunnel and/or a ravine through which the route 102 passes. For example, if the propulsion-generating vehicles 106 include engines that consume oxygen to propel the vehicles 106, then the airflow restricted area 104 may include less oxygen or a reduced flow of oxygen that is capable of being combusted by the engines of the vehicles 106 when the vehicle system 100 travels through the area 104 relative to one or more locations that are outside of the airflow restricted area 104.

As another example, if one or more of the propulsion-generating vehicles 106 include electric circuits that use electric current from an onboard energy store (e.g., a battery) or an off-board source, these circuits can include components that become heated during operation (e.g., inverters, transformers, motors, and the like). These components may have limited heat rejection capabilities and, as a result, can become overheated during travel in the airflow restricted area 104. For example, operation of these components over extended time periods in the reduced airflow environment of the area 104 can result in the components overheating and being unable to continue operating (e.g., to propel the vehicles 106).

The vehicle system 100 can coordinate the operations of the propulsion-generating vehicles 106 as the vehicle system 100 approaches, enters, travels through, and/or exits the airflow restricted area 104. The operations of the vehicles 106 can be coordinated with respect to one another in order to cause the vehicle system 100 to travel through and exit from the airflow restricted area 104 within a designated time period. This designated time period may be based on a schedule of the vehicle system 100. For example, the vehicle system 100 may need to travel through the airflow restricted area 104 within the designated time period in order to remain on schedule and not fall behind schedule.

Additionally or alternatively, the designated time period may be based on a lower speed limit (e.g., a minimum speed) that the vehicle system 100 is required to maintain while traveling in the airflow restricted area 104. For example, the vehicle system 100 may be required to travel at least as fast as the speed limit while in the area 104 due to a regulatory or legal requirement. As another example, the vehicle system 100 may be required to travel at least as fast as the speed limit while in the area 104 due to a need to keep the vehicle system 100 moving forward toward the exit of the airflow restricted area 104 (e.g., when traveling up an incline). The designated time period may be calculated from the speed limit and the size (e.g., length) of the airflow restricted area 104.

Additionally or alternatively, the designated time period may be based on a trip plan of the vehicle system 100 that designates operational settings of the vehicle system 100 (e.g., throttle settings, power outputs, speed, braking efforts, and the like) as a function of at least one of time elapsed or distanced traveled during a trip along the route 102. A trip plan can differ from a schedule in that the schedule may direct the vehicle system 100 where to be located and at what times the vehicle system 100 is to be at the locations of the schedule. The trip plan, however, may designate the operational settings in order to control the vehicle system 100 within external constraints while achieving one or more goals, such as traveling according to a schedule. The external constraints may be limits on the amount of fuel consumed, the amount of emissions generated, and the like. For example, the vehicle system 100 traveling along the route 102 from a starting location to a finishing location within a designated time according to a trip plan may consume less fuel or produce fewer emissions than the same vehicle system 100 traveling along the same route 102 from the same starting location to the same finishing location within the same designated time, but according to another trip plan or according to manual control of the vehicle system 100. One or more examples of trip plans (also referred to as mission plans or trip profiles) and how the trip plans are determined are provided in U.S. patent application Ser. No. 11/385,354, the entire disclosure of which is incorporated by reference. The designated time period in which the vehicle system 100 is to travel through the airflow restricted area 104 may be based on the trip plan in that the designated operational settings of the trip plan may dictate that the vehicle system 100 travel through the area 104 by a designated time, such as the time that is calculated or estimated for the vehicle system 100 to travel through the area 104 if the vehicle system 100 is using the designated operational settings of the trip plan.

The vehicle system 100 can coordinate the operations of the propulsion-generating vehicles 106 as the vehicle system 100 approaches, enters, travels through, and/or exits the airflow restricted area 104 by controlling the derating of power output provided by one or more of the propulsion-generating vehicles 106 in the area 104. For example, the limited oxygen available for combustion by engines of the vehicles 106 in the area 104 may cause the power output of one or more of the vehicles 106 to decrease. Coordinating the operations of the vehicles 106 in connection with one or more embodiments described herein can limit the decrease in power output of one or more of the vehicles 106 during travel in the area 104 (e.g., limit the extent of derating of the vehicle 106) and/or can control the speed at which the power output of one or more of the vehicles 106 is decreased during travel in the area 104 (e.g., control the speed of derating of the vehicle 106). Limiting the extent of derating and/or controlling the speed of derating of one or more of the vehicles 106 can permit the vehicle system 100 to achieve the goal of traveling through the airflow restricted area 104 within the designated time period and/or so that the vehicle system 100 exits the area 104 with at least a designated speed and/or total power output. For example, if at least a designated speed and/or power output is required to propel the vehicle system 100 up an inclined grade following an exit from the airflow restricted area 104, the operations of the propulsion-generating vehicles 106 can be coordinated so that the speed of the vehicle system 100 and/or the total power output of the vehicles 106 in the vehicle system 100 is at least the designated speed and/or power output.

In one embodiment, a controlling vehicle 106 or 108 can coordinate the operations of other (e.g., controlled) propulsion-generating vehicles 106 in the vehicle system 100. The controlling vehicle 106 or 108 can communicate signals (e.g., wirelessly and/or via one or more wired connections) to the controlled vehicles 106 in order to direct the power outputs of the slave vehicles 106. While one or more examples in the description herein focuses on the leading propulsion-generating vehicle 106 being the controlling vehicle that controls operations of other vehicles 106, the controlling vehicle may be another propulsion-generating vehicle 106 that does not lead the vehicle system 100 (e.g., is not in front of the vehicle system 100 along a direction of travel) or may be a non-propulsion generating vehicle 108.

Figure 2:
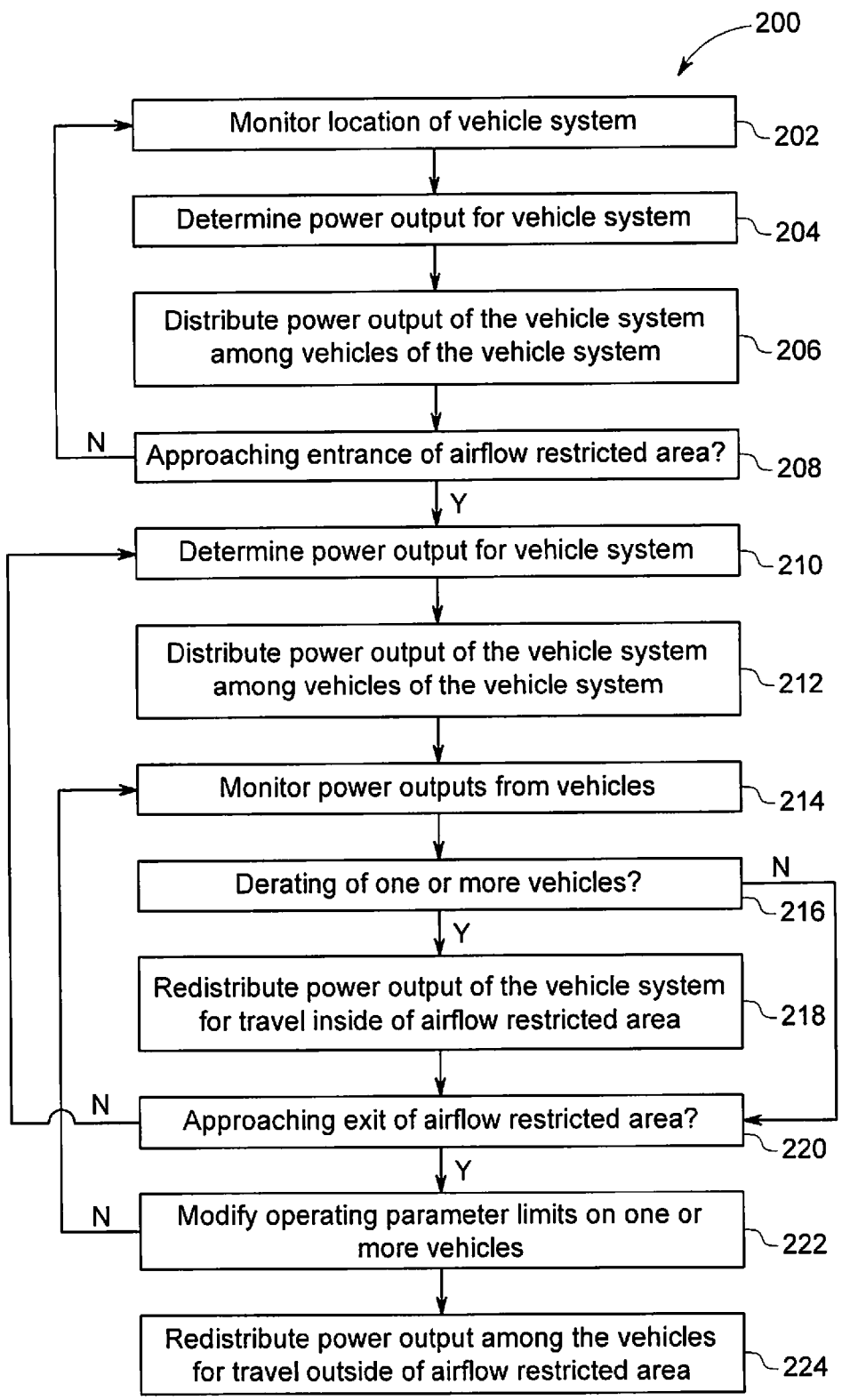
FIG. 2 illustrates a flowchart of one embodiment of a method for controlling the vehicle system shown in FIG. 1.

FIG. 2 illustrates a flowchart of one embodiment of a method 200 for controlling the vehicle system 100. The method 200 is described in connection with the vehicle system 100 as shown in FIGS. 1 and 4-6 described herein. At 202, locations of the vehicle system 100 are monitored as the vehicle system 100 travels along the route 102. For example, a location determining unit disposed onboard the vehicle system 100 may determine the location of the vehicle system 100 along the route 102 as the vehicle system 100 travels toward the airflow restricted area 104.

At 204, a power output of the vehicle system 100 is determined. The power output may be a designated power output that is sufficient to propel the vehicle system 100 along a segment of the route 102. For example, the designated power output may be a lower limit on the amount of power that is generated by the propulsion-generating vehicles 106 to propel the vehicle system 100 along a segment of the route 102. The designated power output may be a constant value over the length of the route 102 in the segment, or may change at one or more locations in the segment of the route 102.

In one embodiment, the total power output of the vehicle system 100 may be determined by calculating or estimating a total power output that causes the vehicle system 100 to travel no faster than an upper speed limit and/or no slower than a lower speed limit. The speed limits may be designated by a government, government agency, owner of the land through which the airflow restricted area 104 extends, the owner of the vehicle system 100, or the like.

Additionally or alternatively, the total power output of the vehicle system 100 may be determined by calculating or estimating an available total amount of power output that can be provided by the vehicle system 100 subject to one or more performance restrictions of the vehicle system 100. For example, the maximum total amount of power that can be generated by the vehicle system 100 may be limited due to deteriorating health of engines, motors, axles, and the like, of the vehicle system 100, due to needed or overdue maintenance of the vehicle system 100, and the like. A maximum total power output that can be provided by the vehicle system 100 without violating one or more of these performance restrictions may be determined as the power output of the vehicle system 100.

The total power output that is determined may be automatically adjusted during travel of the vehicle system 100. For example, the total power output that is determined to be needed to propel the vehicle system 100 along the route 102 may be adjusted as the vehicle system 100 moves due to one or more changes in environmental conditions (e.g., weather changes, changes in the route 102, etc.), a change in the time by which the vehicle system 100 needs to be at another location, changes in the load capability of the vehicle system 100, changes in the traction capability of the vehicle system 100, and the like. When one or more of these changes occur, the total power output may be recalculated based on the changed conditions and/or capabilities. This recalculation may be performed automatically (e.g., in response to a detection that the change has occurred) and/or when manually prompted by an operator.

The designated power output of the vehicle system 100 can be determined based on limitations on audible noise generated by the vehicle system 100. For example, the volume or decibels of audible sound that is generated by the vehicle system 100 during travel within the airflow restricted area 104 may be limited by one or more restrictions established by a government, government agency, owner of the airflow restricted area 104, owner of the land through which the airflow restricted area 104 extends, and/or owner of the vehicle system 100. In order to prevent the propulsion-generating vehicles 106 from creating too much noise within the airflow restricted area 104, the designated power output may be accordingly limited. For example, the designated power output may be kept below a designated threshold. Such a threshold may be based on the number of propulsion-generating vehicles 106 that are disposed within the airflow restricted area 104 at the same time during travel of the vehicle system 100 through the area 104, the volume or decibels of sound that is generated by the propulsion-generating vehicles 106 at various power outputs of the vehicles 106, and the like.

The designated power output for the vehicle system 100 that includes one or more propulsion-generating vehicles 106 that are powered by an onboard energy storage device (e.g., a battery) and/or an off-board source of current (e.g., a catenary or electrified rail) may be based on or limited due to an amount of electric energy or current that is stored in the onboard storage device and/or available from the off-board source, heating of the off-board source and/or the components of the vehicle system 100 that obtain the electric current from the off-board source (e.g., a pantograph), and the like.

The designated power output of the vehicle system 100 can be determined from a trip plan of the vehicle system 100. For example, the trip plan may designate the total power output that is to be provided by the propulsion-generating vehicles 106 for travel through a segment of the route 102. The designated power output can be calculated or estimated from information associated with the vehicle system 100 and/or the route 102. For example, the designated power output can be calculated by modeling how much horsepower is needed to propel the vehicle system 100 through the segment of the route 102 (and within the designated time period and/or such that at least a designated speed and/or power output is achieved upon exiting the segment of the route 102) based on the grade of the route 102 within the segment, the curvature of the route 102 within the segment, the power capability of the propulsion-generating vehicles 106, the health of the propulsion-generating vehicles 106, the size (e.g., length and/or mass) of the vehicle system 100, the drag of the vehicle system 100, the weight distribution of the vehicle system 100, the number and/or distribution of the propulsion-generating vehicles 106 within the vehicle system 100, and the like.

In one embodiment, the designated power output can be determined from previous trips of the vehicle system 100 along the route 102, such as by basing the designated power output for a current trip along the route 102 on one or more previous trips along the route 102 where the same or a similar vehicle system 100 was or was not able to travel along the route 102 and achieve one or more goals (e.g., traveling over the segment of the route 102 within the designated time period and/or with at least a designated speed). In one embodiment, performance of the vehicle system 100 can be monitored as the vehicle system 100 travels and used to determine and/or update the designated power output. For example, the actual power output provided by the vehicle system 100 at various throttle settings of the propulsion-generating vehicles 106, over various grades of the route 102, and the like, may be monitored during travel to learn the performance of the vehicle system 100 in different conditions. Changes and/or trends in the performance may be used to determine and/or modify the designated power output. Alternatively, the designated power output may not be based on a previous trip of the vehicle system 100.

The designated power output can be based on heat rejection capabilities of components of the vehicle system 100. The components onboard the vehicle system 100 that enable the propulsion-generating vehicles 106 to propel the vehicle system 100 may have limitations on how much thermal energy the components can reject and how rapidly these components can reject thermal energy that is absorbed by the components. For example, electric circuits (e.g., inverters, transformers, motors, and the like) that electrically power and propel the vehicle system 100 may have limitations on how much heat the circuits can absorb and how quickly the absorbed heat can be dissipated. The designated power output for the vehicle system 100 may be limited such that the thermal energy that is absorbed by the components of the vehicle system 100 does not exceed a threshold, such as an amount of thermal energy that cannot be rejected by the components sufficiently fast to avoid overheating the components.

At 206, the designated power output of the vehicle system 100 is distributed among the propulsion-generating vehicles 106 of the vehicle system 100. For example, the total power output that is calculated as being needed to propel the vehicle system 100 through a segment of the route 102 within a designated time period and/or with at least a designated speed and/or power output may be divided up among the propulsion-generating vehicles 106. By "distributed" or "divided up," it is meant that different propulsion-generating vehicles 106 in the vehicle system 100 may be assigned to generate different portions or subsets of the designated power output of the vehicle system 100 such that no single propulsion-generating vehicle 106 generates all of the designated power output, but that a sum or aggregate of the power outputs of two or more of the propulsion-generating vehicles 106 generates the designated power output of the vehicle system 100. Alternatively, the total power output may be divided up so that a single propulsion-generating vehicle 106 provides all of the total power output.

At 208, a determination is made as to whether the vehicle system 100 is approaching an entrance 110 (shown in FIG. 1) of the airflow restricted area 104. For example, the location of an entry into a tunnel or ravine may be stored in a database or other memory component or structure, and the locations of the vehicle system 100 may be compared to the location of the entry on a periodic, continuous, or on-demand basis. The location of the vehicle system 100 may be determined by the controlling vehicle in one embodiment. Alternatively, the location of the vehicle system 100 may be determined by another vehicle (e.g., a controlled vehicle 106 or a non-propulsion generating vehicle 108).

If the location of the vehicle system 100 (e.g., the leading or first vehicle 106 or 108, such as the propulsion-generating vehicle 104A in FIG. 1) is within a designated distance of the entrance 110, then the operations of the propulsion-generating vehicles 104 may need to begin to be coordinated with each other to permit the vehicle system 100 to travel through the airflow restricted area 104. For example, the operations of the propulsion-generating vehicles 106 may, up until the location of the vehicle system is within the designated distance of the entrance 110, be manually controlled or be controlled based on a trip plan. When the vehicle system 100 approaches the entrance 110, however, these operations may need to be altered or coordinated with each other in a manner that differs from the manual control or from the operations that are designated by the trip plan. For example, if left unchanged, the manual control of the propulsion-generating vehicles 106 may result in one or more of the propulsion-generating vehicles 106 derating too much and/or too quickly such that the vehicle system 100 is unable to pass through the airflow restricted area 104 within the designated time period and/or such that the vehicle system 100 has insufficient power to continue traveling up an incline following the airflow restricted area 104. As another example, the designated operational settings of the trip plan may result in one or more of the propulsion-generating vehicles 106 derating too much and/or too quickly such that the vehicle system 100 is unable to pass through the airflow restricted area 104 within the designated time period and/or such that the vehicle system 100 has insufficient power and/or speed to continue traveling up an incline following the airflow restricted area 104. Therefore, once it is determined that the vehicle system 100 is coming relatively close to the entrance 110 of the airflow restricted area 104, control of the operations of the propulsion-generating vehicles 106 may be altered to cause the vehicle system 100 to travel through the area 104 within the designated time period and/or to cause the vehicle system 100 to provide sufficient speed and/or power upon exiting the area 104. The operations of the propulsion-generating vehicles 106 may be autonomously controlled. Alternatively, one or more messages or alarms may be presented to an operator of the vehicle system 100 to direct the operator on how to control the operations of the propulsion-generating vehicles 106.

If the vehicle system 100 is approaching the entrance 110 to the airflow restricted area 104, then flow of the method 200 may proceed to 210. On the other hand, if the vehicle system 100 is not yet close to the entrance 110, then flow of the method 200 may return to 202 where the locations of the vehicle system 100 continue to be monitored. If the vehicle system 100 is approaching or has reached a destination location of the trip, then the vehicle system 100 may cease monitoring the location of the vehicle system 100, determining a total power output, and/or distributing the total power output.

At 210, a power output of the vehicle system 100 is determined. The power output may be a designated power output that is sufficient to propel the vehicle system 100 through the airflow restricted area 104. For example, the designated power output may be a lower limit on the amount of power that is generated by the propulsion-generating vehicles 106 to propel the vehicle system 100 through the airflow restricted area 104 and out of an exit 112 (shown in FIG. 1) of the airflow restricted area 104. The designated power output may be a constant value over the length of the route 102 in the area 104, or may change at one or more locations in the area 104. For example, different sections of the route 102 in the area 104 may be associated with different designated power outputs for the vehicle system 100.

In one embodiment, the total power output of the vehicle system 100 may be determined by calculating or estimating a total power output that causes the vehicle system 100 to travel at or within a relatively small designated threshold (e.g., less than 10%, 5%, 3%, 1%, or the like) of a speed limit within the airflow restricted area 104. For example, a maximum total power output that can be provided by the vehicle system 100 without causing the vehicle system 100 to travel faster than an upper speed limit associated with travel within the airflow restricted area 104 may be determined as the power output of the vehicle system 100.

Additionally or alternatively, the total power output of the vehicle system 100 may be determined by calculating or estimating a maximum total power output that can be provided by the vehicle system 100 subject to one or more performance restrictions of the vehicle system 100. For example, the total amount of power that can be generated by the vehicle system 100 may be limited due to deteriorating health of engines, motors, axles, and the like, of the vehicle system 100, due to needed or overdue maintenance of the vehicle system 100, and the like. A maximum total power output that can be provided by the vehicle system 100 without violating one or more of these performance restrictions may be determined as the power output of the vehicle system 100.

The total power output that is determined may be automatically adjusted during travel of the vehicle system 100. For example, the total power output that is determined to be needed to propel the vehicle system 100 through the area 104 may be adjusted as the vehicle system 100 moves due to one or more changes in environmental conditions (e.g., weather changes, changes in the route 102, etc.), a change in the time by which the vehicle system 100 needs to be at another location, changes in the load capability of the vehicle system 100, changes in the traction capability of the vehicle system 100, and the like. When one or more of these changes occur, the total power output may be recalculated based on the changed conditions and/or capabilities. This recalculation may be performed automatically (e.g., in response to a detection that the change has occurred) and/or when manually prompted by an operator.

If the aggregate power generated by the propulsion-generating vehicles 106 during travel through the area 104 is less than the designated power output, then the vehicle system 100 may be unable to travel through and exit out of the airflow restricted area 104 through the exit 112 (e.g., the vehicle system 100 may stall inside the airflow restricted area 104). As another example, if the aggregate power generated by the propulsion-generating vehicles 106 during travel through the area 104 is less than the designated power output, then the vehicle system 100 may be able to travel through and exit out of the airflow restricted area 104, but the vehicle system 100 may not be able to do so within the designated time period and/or with at least a designated speed and/or designated power output upon exiting the airflow restricted area 104. For example, the vehicle system 100 may take too long to travel through the area 104 and/or may have insufficient speed and/or power output to travel up an incline upon exiting the area 104 such that the vehicle system 100 deviates from a trip plan of the vehicle system 100.

The designated power output of the vehicle system 100 can be determined from a trip plan of the vehicle system 100. For example, the trip plan may designate the total power output that is to be provided by the propulsion-generating vehicles 106 for travel through the airflow restricted area 104. The designated power output can be calculated or estimated from information associated with the vehicle system 100, the route 102, and/or the area 104. For example, the designated power output can be calculated by modeling how much horsepower is needed to propel the vehicle system 100 through the area 104 (and within the designated time period and/or such that at least a designated speed and/or power output is achieved upon exiting the area 104) based on the grade of the route 102 within the area 104, the grade of the route 102 past the exit 112 of the area 104, the curvature of the route 102 within the area 104, the power capability of the propulsion-generating vehicles 106, the health of the propulsion-generating vehicles 106, the size (e.g., length and/or mass) of the vehicle system 100, the drag of the vehicle system 100, the weight distribution of the vehicle system 100, the number and/or distribution of the propulsion-generating vehicles 106 within the vehicle system 100, and the like. By way of example, the designated power output can increase when the route 102 has an inclined grade in the area 104 and/or following the exit 112 of the area 104, the route 102 curves within the area 104, one or more the propulsion-generating vehicles 106 are unable to provide as much power output as other vehicles 106 due to decreased capabilities and/or diminished health (e.g., such that the vehicles 106 having greater power capabilities may need to provide more power), the vehicle system 100 is heavier and/or longer, and/or the vehicle system 100 has larger air drag. Conversely, the designated power output can decrease when the route 102 has a declined grade in the area 104 and/or following the exit 112 of the area 104, the route 102 is relatively straight within the area 104, the vehicle system 100 is lighter and/or shorter, and/or the vehicle system 100 has a smaller air drag.

The designated power output can be determined from previous trips of the vehicle system 100 through the area 104, such as by basing the designated power output for a current trip through the area 104 on one or more previous trips through the area 104 where the same or a similar vehicle system 100 was or was not able to travel through the area 104 and achieve one or more goals (e.g., exiting within the designated time period and/or exiting with at least a designated speed and/or power output). In one embodiment, performance of the vehicle system 100 can be monitored as the vehicle system 100 travels and used to determine and/or update the designated power output. For example, the actual power output provided by the vehicle system 100 at various power demand settings of the propulsion-generating vehicles 106 (e.g., throttle or other settings), over various grades of the route 102, and the like, may be monitored during travel to learn the performance of the vehicle system 100 in different conditions. Changes and/or trends in the performance may be used to determine and/or modify the designated power output.

At 212, the designated power output of the vehicle system 100 is distributed among the propulsion-generating vehicles 106 of the vehicle system 100. For example, the total power output that is calculated as being needed to propel the vehicle system 100 through the airflow restricted area 104 in order to exit the area 104 within the designated time period and/or to exit with at least a designated speed and/or power output may be divided up among the propulsion-generating vehicles 106.

Figure 3:
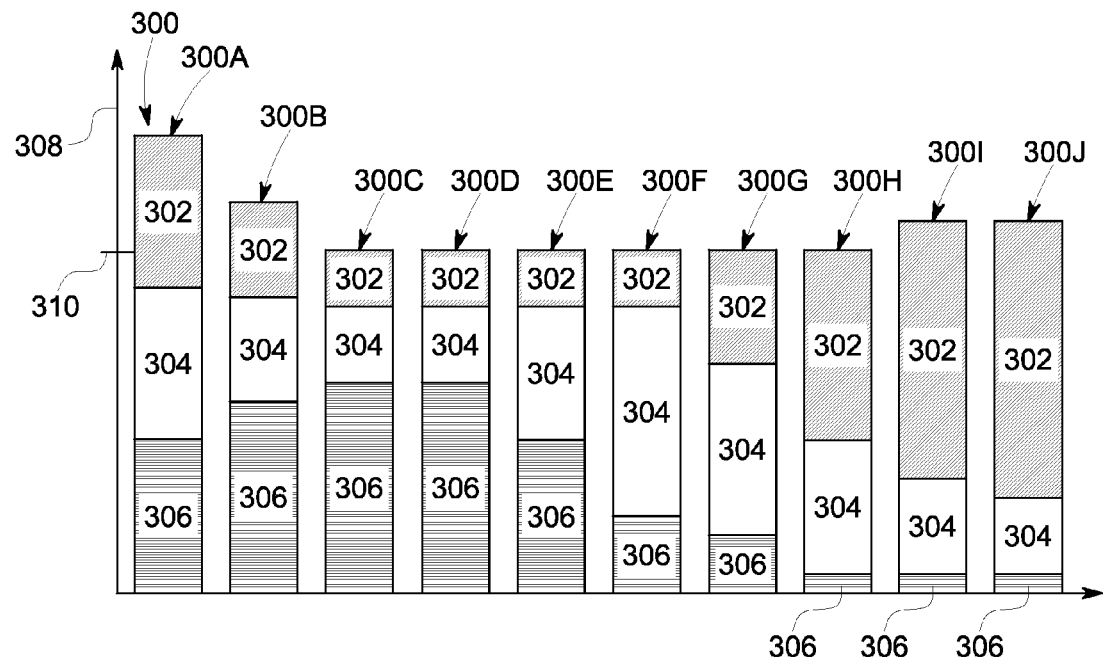
FIG. 3 illustrates a histogram representative of total power outputs of the vehicle system shown in FIG. 1 in accordance with one example.

With continued reference to the method 200 shown in FIG. 2, FIG. 3 illustrates a histogram representative of total power outputs 300 (e.g., total power outputs 300A-J) of the vehicle system 100 in accordance with one example. The total power outputs 300 are shown alongside a vertical axis 308 representative of power output, such as horsepower, that is generated by the propulsion-generating vehicles 106 of the vehicle system 100. The total power outputs 300 are associated with different times or locations of the vehicle system 100 during travel toward, within, and out of the airflow restricted area 104. For example, the total power outputs 300A-C can be associated with times and/or locations when the vehicle system 100 is traveling toward and/or entering into the airflow restricted area 104, the total power outputs 300D-H can be associated with times and/or locations when the vehicle system 100 is traveling within the airflow restricted area 104, and the total power outputs 300 I-J can be associated with times and/or locations when the vehicle system 100 is exiting out of the airflow restricted area 104. As described below, the total power outputs 300 may additionally or alternatively represent the different total power outputs to be provided by consists of the vehicle system 100 at different times.

Each of the total power outputs 300 is formed from multiple individual power outputs 302, 304, 306 of the propulsion-generating vehicles 106. For example, the individual power outputs 302 in the total power outputs 300A-J can represent the power outputs that are generated by the propulsion-generating vehicle 106A, the individual power outputs 304 can represent the power outputs that are generated by the propulsion-generating vehicle 106B, and the individual power outputs 306 can represent the power outputs that are generated by the propulsion-generating vehicle 106C. As described below, the individual power outputs 302, 304, 306 may additionally or alternatively represent the total power outputs to be provided by the different consists of the vehicle system 100.

The total power output 300A can represent the total power output of the vehicle system 100 when the determination is made that the vehicle system 100 is approaching or is about to enter into the airflow restricted area 104. The third total power output 300C can be equal to or no less than a designated power output 310 of the vehicle system 100. As described above, the designated power output 310 may be the total power output that is provided by the propulsion-generating vehicles 106 and that is necessary or useful to propel the vehicle system 100 through the airflow restricted area 104 within the designated time period and/or with providing at least a designated speed and/or power output upon exiting the area 104, as described above.

As shown in FIG. 3, the distribution of the total power output of the vehicle system 100 among the propulsion-generating vehicles 106 (e.g., at 212 of the method 200) can involve the total power output decreasing from the first power output 300A to the second power output 300B, and from the second power output 300B to the third power output 300C (e.g., the designated power output 310) as the vehicle system 100 approaches and/or enters the entrance 110 to the airflow restricted area 104. The distribution of the power output among the propulsion-generating vehicles 106A-C can include decreasing the total power output 300 provided by the vehicle system 100 and changing the individual power outputs 302, 304, 306 generated by the propulsion-generating vehicles 106A-C. For example, as shown among the total power outputs 300A-C, the power output 302 generated by the propulsion-generating vehicle 106A can decrease and the power output 304 generated by the propulsion-generating vehicle 106B can decrease, while the power output 306 generated by the propulsion-generating vehicle 106C can increase.

As the vehicle system 100 enters into the airflow restricted area 104 (e.g., as shown in FIG. 4), the total power output of the vehicle system 100 may be represented by the total power output 300C and/or 300D. The individual power outputs 302, 304, 306 of the propulsion-generating vehicles 106 may change as the vehicle system 100 approaches and/or enters the airflow restricted area 104 in order to prepare the vehicles 106 for the decreased airflow within the area 104. The power outputs 302, 304 of the vehicles 106A, 106B that lead the vehicle 106C along the direction of travel of the vehicle system 100 may be decreased while the power output 306 of the trailing vehicle 106C is increased. The power outputs 302, 304 of the leading vehicles 106A, 106B may be decreased in order to reduce the temperature and/or generation of heat in the propulsion systems (e.g., engines, motors, cooling systems, electric circuits, inverters, transformers, and the like) of the leading vehicles 106A, 106B before the vehicle system 100 is inside the airflow restricted area 104. In order to ensure that the vehicle system 100 has sufficient total power output 300 to propel the vehicle system 100 through the area 104, however, the power output 306 of the trailing vehicle 106C may be increased (e.g., to at least partially make up for the decreased power outputs 302, 304 of the leading vehicles 106A, 106B).

In one embodiment, the power outputs 302, 304, 306 from the propulsion-generating vehicles 106 change based on positions of the vehicles 106 within the vehicle system 100. For example, as the vehicle system 100 approaches the entrance 110 to the airflow restricted area 104, the power output of the propulsion-generating vehicle that leads the other propulsion-generating vehicles (e.g., the vehicle 106A) may decrease more than the next propulsion-generating vehicle (e.g., the vehicle 106B), which may decrease more than the next propulsion-generating vehicle, and so on. The propulsion-generating vehicles that are located farther back in the vehicle system 100 (e.g., the propulsion-generating vehicle 106C) may increase power output. The relative increase in power output may be smaller for the propulsion-generating vehicles that are located closer to the front end of the vehicle system 100. For example, if the vehicle system 100 included five propulsion-generating vehicles 106, the first propulsion-generating vehicle 106 (along the direction of travel) may decrease power output the most, the second propulsion-generating vehicle 106 may decrease power output the second most, and the third propulsion-generating vehicle 106 may decrease power output less than both the first and second propulsion-generating vehicles 106. The fifth (and last) propulsion-generating vehicle 106 may increase power output the most and more than the increase in power output from the fourth propulsion-generating vehicle 106.

One or more of the leading propulsion-generating vehicles 106A, 106B may undergo a pre-cooling stage of operations as the vehicle system 100 approaches the entrance 110 to the airflow restricted area 104. This can include cooling components of the propulsion systems of the vehicles 106A, 106B, such as the engines, motors, cooling systems, electric circuits, transformers, inverters, and the like. By way of example, the speed of cooling fans or blowers that cool the propulsion systems and/or associated electric circuits may increase and resistive grids of braking systems of the vehicles 106A, 106B may reject additional current (e.g., heat). As a result, the temperatures of the components of the propulsion systems of the leading vehicles 106A, 106B may decrease as the vehicle system 100 approaches the airflow restricted area 104, which can result in decreased oil temperatures in the propulsion systems, decreased cooling fluid temperatures in cooling systems of these propulsion systems, and/or electric components that are not as hot as the components would be if the pre-cooling was not performed (e.g., transformers, inverters, motors, and the like).

Returning to the discussion of the method 200 shown in FIG. 2, at 214, the power outputs 302, 304, 306 provided by the propulsion-generating vehicles 106 are monitored during travel of the vehicle system 100 in the airflow restricted area 104. For example, the power outputs 302, 304, 306 may be measured by dynamometers or other sensors disposed onboard the propulsion-generating vehicles 106.

During travel in the area 104, the reduced airflow can cause the power output 302, 304, 306 provided by one or more of the propulsion-generating vehicles 106 to decrease. For example, the propulsion-generating vehicle 106C may begin to derate. With respect to the propulsion-generating vehicles 106 that combust fuel, the power output 306 from the vehicle 106C may decrease because of the decrease in oxygen available for combustion by the propulsion system of the vehicle 106C and/or due to the increase intake into the engine of the vehicle 106C of exhaust from the propulsion systems of the leading vehicles 106A, 106B. As a result, the temperature of the propulsion system (e.g., the engine temperature, oil temperature, cooling fluid temperature, and the like) of the trailing vehicle 106C may increase and less oxygen may be available for generating propulsive force. The increases in temperature and reduced oxygen can cause the propulsion system of the trailing vehicle 106C to derate. With respect to the propulsion-generating vehicles 106 that are electrically powered (e.g., via an onboard energy store of electric energy and/or an off-board source of electric current), the power output 306 from the vehicle 106C may decrease because of the decrease in airflow available for cooling electric components of the vehicle 106, such as transformers, inverters, motors, and the like. The increases in temperature can cause the propulsion system of the trailing vehicle 106C to derate.

At 216, a determination is made as to whether the power output 302, 304, 306 generated by one or more of the propulsion-generating vehicles 106 is derating (e.g., decreasing). This determination may be made for the propulsion-generating vehicles 106 whose power output 302, 304, 306 was increased when the total power output 300 of the vehicle system 100 was distributed among the propulsion-generating vehicles 106. For example, the power output of the propulsion-generating vehicle 106C that is trailing one or more other propulsion-generating vehicles 106A, 106B may be examined to determine if the power output decreases during travel of the vehicle system 100 in the airflow restricted area 104 (e.g., as shown in FIG. 5).

As one example, if the power output 306 of the propulsion-generating vehicle 106C decreases, then the power outputs 302 and/or 304 generated by one or more other (e.g., leading) propulsion-generating vehicles 106A and/or 106B may be increased. For example, more power may be needed from other propulsion-generating vehicles 106 that are not derating in the airflow restricted area 104. The power output 302 and/or 304 from one or more of the propulsion-generating vehicles 106 that lead (e.g., are ahead of) the derating propulsion-generating vehicle 106 may need to be increased. As a result, flow of the method 200 may proceed to 214.

On the other hand, if the power output 306 of the propulsion-generating vehicle 106C is not derating, then the power outputs 302, 304 generated by one or more other propulsion-generating vehicles 106A and/or 106B may not need to be increased. For example, the same or similar distribution of power outputs 302, 304, 306 from the propulsion-generating vehicles 106 may be sufficient to continue propelling the vehicle system 100 through the airflow restricted area 104. As a result, flow of the method 200 may proceed to 216.

At 218, the total power output 300 of the vehicle system 100 is redistributed among the propulsion-generating vehicles 106. The total power output 300 may be redistributed by changing the relative power outputs provided by each of the propulsion-generating vehicles 106, while still providing at least the designated power output 310 of the entire vehicle system 100 that is needed or useful to travel through the airflow restricted area 104. The power output 306 provided by the propulsion-generating vehicle 106C that trailed one or more other propulsion-generating vehicles 106A, 106B may be decreased while the power output 320 and/or 304 provided by one or more of the propulsion-generating vehicles 106A and/or 106B that lead the trailing propulsion-generating vehicle 106C is increased.

In the example shown in FIG. 3, the total power outputs 300D and 300E can represent the distribution of the power outputs provided by the vehicles 106A-C during travel in the airflow restricted area 104. As shown, the power output 306 provided by the trailing propulsion-generating vehicle 106C decreases (e.g., derates). In order to compensate for this decrease, the propulsion-generating vehicle 106B can be directed to increase the power output 304 generated by the vehicle 106B. The power output 302 provided by the other leading propulsion-generating vehicle 106A can remain the same. Alternatively, this power output 302 also can increase, such as by a smaller amount than the increase in the power output 304. In one embodiment, the total power outputs 300 can depend on a designated or desired speed of the vehicle system 100. For example, the total power outputs 300 may not be permitted to exceed a first threshold that would cause the vehicle system 100 to exceed an upper speed limit while traveling in the airflow restricted area 104. Additionally or alternatively, the total power outputs 300 may not be permitted to fall below a second threshold that would cause the vehicle system 100 to travel slower than a lower speed limit while traveling in the airflow restricted area 104

The redistribution of the power outputs 302, 304, 306 provided by the propulsion-generating vehicles 106 during travel in the airflow restricted area 104 and in response to the derating of the trailing propulsion-generating vehicle 106C can allow the vehicle system 100 to continue to generate the designated power output 310. As shown in FIG. 3, the total power output 300 provided by the propulsion-generating vehicles 106 remains approximately the same among the total power outputs 300D and 300E, while the relative contributions of the power outputs 302, 304, 306 provided by the propulsion-generating vehicles 106 changes. As a result, the vehicle system 100 may continue to travel in the airflow restricted area 104 without falling behind or otherwise deviating from travel that results in the vehicle system 100 passing through the area 104 within the designated time and/or the vehicle system 100 exiting from the area 104 with at least a designated speed and/or power output.

At 220, a determination is made as to whether the vehicle system 100 is approaching the exit 112 of the airflow restricted area 104. For example, the location of the vehicle system 100 in the airflow restricted area 104 may be determined using a location determining unit, and/or may be calculated based on the speed of the vehicle system 100 and time elapsed since a previously determined location of the vehicle system 100. If the vehicle system 100 is within a designated distance of the exit 112 (e.g., no farther from the exit 112 than a designated fraction of the total length of the airflow restricted area 104 between the entrance 110 and the exit 112), then the vehicle system 100 may redistribute the total power output 300 among the propulsion-generating vehicles 106 again in order to prepare the vehicle system 100 for exit from the area 104. As a result, flow of the method 200 can proceed to 218.

On the other hand, if the vehicle system 100 is not within the designated distance of the exit 112, then the vehicle system 100 may need to continue monitoring the power outputs 302, 304, 306 of the propulsion-generating vehicles 106 in order to ensure that at least the designated power output 310 is generated for the vehicle system 100. Failing to generate the designated power output 310 can result in the vehicle system 100 not exiting from the airflow restricted area 104 within the designated time period and/or exiting with insufficient speed and/or power output. If the vehicle system 100 is not approaching the exit 112, flow of the method 200 can return to 210.

In one embodiment, the propulsion-generating vehicles 106 can increase the total power output 300 of the vehicle system 100 in response to determining that the vehicle system 100 is approaching the entrance 110 to the airflow restricted area 104. For example, the propulsion-generating vehicles 106 can increase the power outputs 302, 304, and/or 306 in order to speed up toward the entrance 110. Increasing the total power output 300 leading up to the area 104 can allow the designated power output 310 to be decreased. For example, entering the area 104 with increased power output 300 and/or increased speed may require a smaller designated total power 300 to travel through the area 104.

In continuing with the example shown in FIGS. 1 and 3-6, the vehicle system 100 may not be near the exit 112 of the airflow restricted area 104 when the propulsion-generating vehicles 106 are generating the total power output 300E. As a result, flow of the method 200 returns to 210 where the power outputs 302, 304, 306 of the propulsion-generating vehicles 106 continue to be monitored.

The total power output 300F represents the distribution of power outputs 302, 304, 306 provided by the propulsion-generating vehicles 106 at a later time while the propulsion-generating vehicles 106 are still located inside the airflow restricted area 104. As shown in FIG. 3, the power output 306 from the propulsion-generating vehicle 106C continues to derate. The total power output 300F is again redistributed among the propulsion-generating vehicles 106 so that the total power output 300F is no less than the designated power output 310. In the illustrated example, the power output 306 of the trailing propulsion-generating vehicle 106C continues to derate while the power output 304 of the middle propulsion-generating vehicle 106B is increased. The power output 302 of the leading propulsion-generating vehicle 106A may remain the same as in the total power output 300E.

The power outputs 302, 304, 306 and the location of the vehicle system 100 in the airflow restricted area 104 continue to be monitored as the vehicle system 100 is located in the area 104 (e.g., as shown in FIG. 5). As shown in the total power outputs 300F, 300G, and 300H, the third propulsion-generating vehicle 106C continues to derate and, as a result, the individual power output 306 provided by the third propulsion-generating vehicle 106C continues to decrease. Additionally, due to the reduced supply of oxygen, the reduced airflow, the increased temperature, and/or the intake of exhaust that is trapped in the airflow restricted area 104, the second propulsion-generating vehicle 106B also may begin to derate, as shown by the decrease in the individual power output 304 provided by the second propulsion-generating vehicle 106B. In response to the derating of the two trailing propulsion-generating vehicles 106B, 106C, the total power output 300 may be redistributed so that the leading propulsion-generating vehicle 106A increases the individual power output 302. As a result, the total power outputs 300G, 300H remain at least as great as the designated power output 310.

The vehicle system 100 may continue to monitor the power outputs 302, 304, 306 of the propulsion-generating vehicles 106 and redistribute the power outputs 302, 304, 306 in order to maintain the total power output 300 at or above the designated power output 310 until the vehicle system 100 is within the designated distance of the exit 112 from the airflow restricted area 104 (e.g., at 220, as described above). As shown in the total power outputs 300G, 300H, the power output 302 of the propulsion-generating vehicle 106A may continue to be increased in order to make up for the derating of the propulsion-generating vehicles 106B, 106C.

Returning to the description of the method 200 shown in FIG. 2, at 222, operating parameter limits on one or more of the propulsion-generating vehicles 106 can be modified in response to the vehicle system 100 approaching the exit 112 of the airflow restricted area 104. Alternatively, no operating parameter limits on the propulsion-generating vehicles 106 are modified. The operating parameter limits that are modified can include limits on allowable temperatures of the lubricant (e.g., oil) in the engines of the vehicles 106, limits on allowable temperatures of coolant (e.g., water) in the cooling systems of the vehicles 106, limits on temperature differences between the temperature of the engine lubricant and the coolant, and the like. As one example, an upper limit on the oil temperature, an upper limit on the coolant temperature, and/or an upper limit on the temperature difference between the oil and coolant of the leading propulsion-generating vehicle 106A may be increased above a previously defined or designated limit.

Increasing one or more of these limits may allow the propulsion-generating vehicle 106A to increase the power output 302 generated by the propulsion-generating vehicle 106A without the propulsion system of the propulsion-generating vehicle 106A autonomously decreasing the power output 302. For example, the propulsion system of the vehicle 106A may apply one or more safeguards (e.g., limits) on lubricant temperature, coolant temperature, and/or the difference between the temperatures of lubricant and coolant. When violated, these safeguards can include automatically decreasing the power output 302 of the vehicle 106A, automatically placing the propulsion system of the vehicle 106A into idle, or other safeguards that protect the propulsion system of the vehicle 106A. For example, when the actual lubricant temperature exceeds the lubricant temperature limit, the actual coolant temperature exceeds the coolant temperature limit, and/or the difference between the actual lubricant temperature and the actual coolant temperature exceeds the limit on temperature difference between the lubricant and coolant, the propulsion system may automatically power down in order to prevent damage to the propulsion system.

If the vehicle system 100 is approaching the exit 112 of the airflow restricted area 104, however, one or more of these limits may be temporarily increased for the propulsion-generating vehicle 106 so that the propulsion system of the vehicle 106 can increase the power output generated by the vehicle 106. For example, the lubricant temperature limit, the coolant temperature limit, and/or the temperature difference limit (between the temperatures of the lubricant and the coolant) may be increased for the propulsion-generating vehicle 106A when the propulsion-generating vehicle 106A is relatively close to exiting the airflow restricted area 104. The increase may be temporary and the limits on the parameters may be re-set to the previous default or designated values when the propulsion-generating vehicle 106A exits the airflow restricted area 104. In one embodiment, one or more of the limits on parameters may not be modified beyond one or more boundaries. For example, the coolant temperature limit may not be able to be increased to or above a boiling temperature of the coolant.

The increase in the limits can allow the propulsion-generating vehicle 106A to increase the power output 302 generated by the vehicle 106A. As shown by the power outputs 300I, 300J, the increase in the power output 302 of the propulsion-generating vehicle 106A can increase the total power output 300 of the vehicle system 100 above the designated power output 310 in one embodiment, even though the power outputs 302, 304 of the propulsion-generating vehicles 106B, 106C continue to decrease or at least not increase. The increase in the power output 302 of the propulsion-generating vehicle 106A as the vehicle system 100 approaches the exit 112 and exits the airflow restricted area 104 can assist the propulsion system of the vehicle 106A in cooling faster when the vehicle 106A is outside of the area 104. For example, the increased power output 302 can allow the blowers or fans of the vehicle 106A to operate at an increased speed to more rapidly cool the propulsion system of the vehicle 106A.

Additionally or alternatively, the increased power output 302 of the propulsion-generating vehicle 106A at or leading up to the exit 112 can assist the vehicle system 100 having a total power output 300 that is at least as large as the designated power output and/or a speed that is at least as fast as a designated speed necessary or useful for traveling outside of the airflow restricted area 104, such as up an incline in the route 102.

One or more of the leading propulsion-generating vehicles 106 that lead one or more other propulsion-generating vehicles 106 may undergo a pre-cooling stage of operations as the vehicle system 100 approaches the exit 112 of the airflow restricted area 104. As described above, this can include cooling components of the propulsion systems of the vehicles 106A, 106B, such as the engines, motors, cooling systems, electric circuits, transformers, inverters, and the like. By way of example, the speed of cooling fans or blowers that cool the propulsion systems and/or associated electric circuits may increase and resistive grids of braking systems of the vehicles 106A, 106B may reject additional current (e.g., heat). As a result, the temperatures of the components of the propulsion systems of the leading vehicles 106A, 106B may decrease as the vehicle system 100 approaches the exit 112 of the airflow restricted area 104.

In one embodiment, the vehicle system 100 may include both electric-powered propulsion-generating vehicles 106 (e.g., vehicles that are powered from onboard electric energy storage devices, such as batteries, and/or off-board sources of current) and fuel-powered propulsion-generating vehicles 106 (e.g., vehicles that are powered by engines that consume fuel). The order of the vehicles in such a mixed vehicle system 100 may be established in order to improve performance of the vehicle system 100 through the airflow restricted area 104. For example, the electric-powered vehicle 106 may be disposed ahead of the fuel-powered vehicle 106 along the direction of travel. The total power distribution may then be distributed between the vehicles 106 as described herein. Placing the electric-powered vehicle 106 ahead of the fuel-powered vehicle 106 may allow the electric-powered vehicle 106 to provide greater amounts of power output and/or for longer periods of time in the area 104 as the electric-powered vehicle 106 is not disposed behind the fuel-powered vehicle 106 and, as a result, the heating of the electric-powered vehicle 106 from the exhaust of the fuel-powered vehicle 106 is reduced.

As described above, one or more of the propulsion-generating vehicles 106 may derate during travel in the airflow restricted area 104. The rate at which the power output of a propulsion-generating vehicle 106 decreases due to derating can be controlled. This speed may be referred to as a derating speed. The derating speed may be controlled so that the power output generated by the derating vehicle 106 is maintained above a designated power output upon exit from the area 104. For example, a propulsion-generating vehicle 106 may be prevented from derating too quickly so that the vehicle 106 can provide at least a designated power output on exit from the area 104. In one embodiment, the derating speed is controlled by changing how the total power output of the vehicle system 100 is distributed among the vehicles 106. To increase the derating speed of a vehicle 106, the amount of the total power output of the vehicle system 100 that is "distributed to" the vehicle 106 (e.g., that is demanded from the vehicle 106 relative to other vehicles 106) is increased. Conversely, to decrease the derating speed of a vehicle 106, the amount of the total power output of the vehicle system 100 that is distributed to the vehicle 106 (e.g., that is demanded from the vehicle 106 relative to other vehicles 106) is reduced.

The derating speed may be controlled based on a distance that the route 102 extends through the airflow restricted area 104. For example, for longer distances that the vehicle system 100 travels through the area 104, the derating speed of a propulsion-generating vehicle 106 may be decreased or kept below a designated speed or rate so that the derating of the vehicle 106 does not prevent the vehicle 106 from generating power to propel the vehicle system 100 in the area 104. For shorter distances that the vehicle system 100 travels through the area 104, the derating speed of a propulsion-generating vehicle 106 may be increased or kept above a designated speed or rate because the power output from the vehicle 106 may not be needed to propel the vehicle system 100 for a very long distance in the area 104.

The derating speed may be controlled based on a separation distance between consecutive airflow restricted areas 104. For example, a trip along the route 102 may pass through multiple airflow restricted areas 104. The distance along the route 102 between the exit 112 of a first area 104 and the entrance 112 of a second area 104 along a direction of travel of the vehicle system 100 can represent the separation distance. For shorter separation distances, the derating speed of a propulsion-generating vehicle 106 in the first area 104 may be decreased or kept below a designated speed or rate. As a result, the vehicle 106 does not derate at a fast rate such that the vehicle 106 is able to generate relatively more power upon exiting from the first area 104. For longer separation distances, the derating speed of the vehicle 106 in the first area 104 may be increased or kept above a designated speed or rate because the power output from the vehicle 106 may have sufficient time between the first and second areas 104 to cool down and begin generating additional power after exiting the first area 104 and prior to entry into the second area 104. Additionally or alternatively, one or more of the propulsion-generating vehicles 106 may undergo pre-cooling of the propulsion systems as the vehicle system 100 approaches the entrance to one or more of the areas 104 and/or the exit to one or more of the areas 104 in order to reduce the derating speed.

The derating speed may be controlled based on a grade of the route 102 following the exit 112 of the airflow restricted area 104 along the direction of travel of the vehicle system 100. For inclined grades following the exit 112 of the area 104, the derating speed of a propulsion-generating vehicle 106 in the first area 104 may be decreased or kept below a designated speed or rate. As a result, the vehicle 106 does not quickly derate and is able to generate increased power output upon exiting the area 104 (relative to if the vehicle 106 had more quickly derated). For declined grades following the exit 112 of the area 104, the derating speed of a propulsion-generating vehicle 106 in the first area 104 may be increased or kept above a designated speed or rate. As a result, the vehicle 106 derates more quickly and may not be able to generate increased power output upon exiting the area 104 (relative to if the vehicle 106 had more slowly derated). Because of the declined grade upon exit, the increased power output may not be necessary.

Returning to the description of the method 200 shown in FIG. 2, at 224, the total power output 300 of the vehicle system 100 is redistributed for travel outside of the airflow restricted area 104, such as is shown in FIG. 6. The total power output 300 of the vehicle system 100 for travel outside of the airflow restricted area 104 may differ from the designated power output 310 associated with the area 104. The total power output may be redistributed for travel outside of the area 104, such as by increasing the power output 306 from the trailing propulsion-generating vehicle 106C and/or decreasing the power output 302 from the leading propulsion-generating vehicle 106A.

Figure 7:
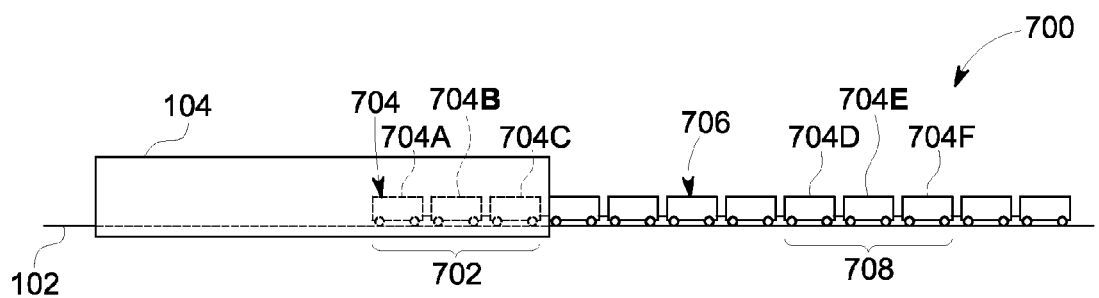
FIG. 7 illustrates a diagram of another embodiment of a vehicle system traveling entering the airflow restricted area.
Figure 8:
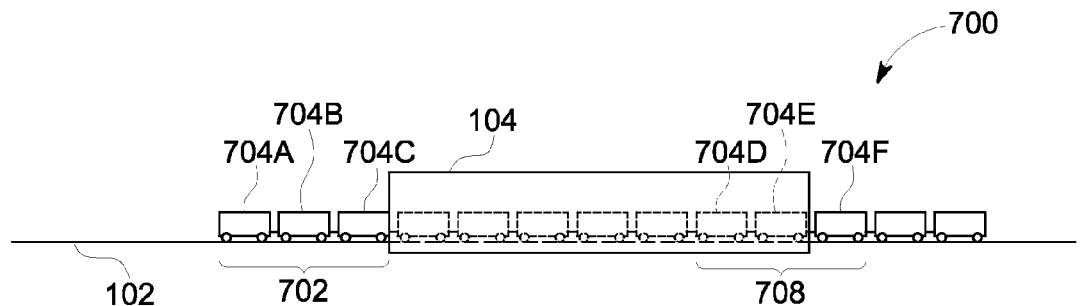
FIG. 8 illustrates a diagram of another embodiment of the vehicle system shown in FIG. 7 traveling in the airflow restricted area.
Figure 9:
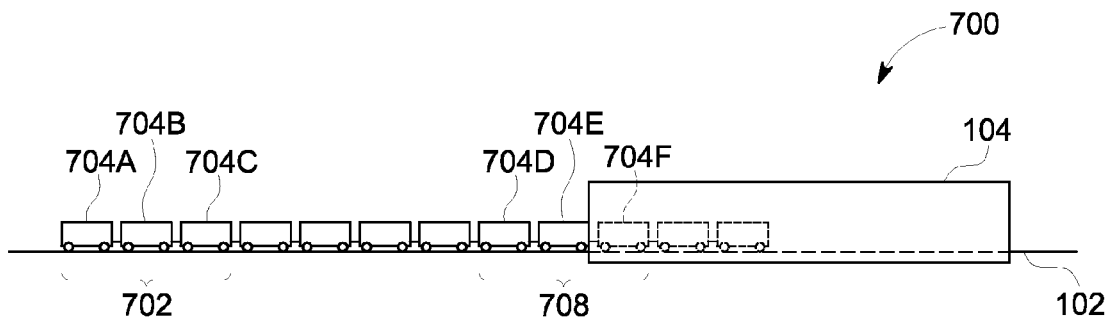
FIG. 9 illustrates a diagram of another embodiment of a vehicle system shown in FIG. 7 traveling exiting the airflow restricted area.

FIGS. 7 through 9 illustrate schematic diagrams of another embodiment of a vehicle system 700 traveling through the airflow restricted area 104. The vehicle system 700 may be similar to the vehicle system 100 shown in FIG. 1 in that the vehicle system 700 includes several propulsion-generating vehicles 704 (e.g., vehicles 704A-F) and several non-propulsion generating vehicles 706 mechanically coupled with each other to travel along the route 102. The propulsion-generating vehicles 704 may be similar to the propulsion-generating vehicles 106 (shown in FIG. 1) and the non-propulsion generating vehicles 706 may be similar to the non-propulsion generating vehicles 108 (shown in FIG. 1).

The vehicle system 700 includes the propulsion-generating vehicles 704 grouped together in two different consists 702, 708 that are separated from each other by one or more of the non-propulsion generating vehicles 706. In contrast to the vehicle system 100, the consists 702, 708 are separated from each other by a sufficiently large distance that at least one consist 702, 708 remains at least partially outside of the airflow restricted area 104 as the vehicle system 700 travels through the area 104.

While the illustrated vehicle system 700 includes two consists 702, 708 with three propulsion-generating vehicles 704 in each consist 702, 708, alternatively, a greater number of consists 702, 708 and/or a different number (e.g., as small as one or larger than three) of propulsion-generating vehicles 704 can be included in one or more of the consists 702 and/or 708.

As the vehicle system 700 approaches the airflow restricted area 104, one or more of the consists 702, 708 may undergo pre-cooling, similar to as described above. For example, the propulsion-generating vehicles 704 in the leading consist 702 may pre-cool the propulsion systems in the vehicles 704 of the consist 702 similar to as described above in connection with the vehicle system 100 approaching the airflow restricted area 104. The total power output of the vehicle system 700 may be distributed among the propulsion-generating vehicles 704, as described above. Additionally, as each consist 702, 708 travels through the area 104, the total power output (e.g., the output 300) for each consist 702, 708 may be distributed, monitored, and re-distributed among the propulsion-generating vehicles 704 in the consist 702, 708 when the consist 702, 708 is traveling in the area 104, as described above.

In the illustrated embodiment, the consist 702 or 708 that is located outside of the airflow restricted area 104 may generate additional power output and/or the consist 702 or 708 that is located inside the airflow restricted area 104 may decrease power output during travel of the vehicle system 700 through the area 104. The total power output of the vehicle system 700 may be an aggregate of the total power output provided by the consist 702 and the total power output provided by the consist 708. When the consist 702 is traveling in the area 104 (e.g., as shown in FIG. 7), the total power output of the vehicle system 700 may be redistributed among the consists 702, 708. For example, the power output generated by the consist 708 may increase while the power output generated by the consist 702 decreases. Additionally or alternatively, the power output provided by the consist 702 may be redistributed among the propulsion-generating vehicles 704, similar to as described above in connection with the propulsion-generating vehicles 106 of the vehicle system 100. The total power output of the vehicle system 700 can be redistributed between the consists 702, 708 and/or within the consist 702 (e.g., between the propulsion-generating vehicles 704A-C) so that the entire vehicle system 700 travels through and exits the area 104 within a designated time period and/or with at least a designated speed and/or power output, as described above.

When the consist 702 has exited the airflow restricted area 104 and the consist 708 is entering and/or in the area 104 (e.g., as shown in FIGS. 8 and 9), the power output generated by the consist 702 may increase while the power output generated by the consist 708 decreases. For example, the consist 702 may assist in pulling the consist 708 through the area 104. Additionally or alternatively, the power output provided by the consist 708 may be redistributed among the propulsion-generating vehicles 704D-F, similar to as described above in connection with the propulsion-generating vehicles 106 of the vehicle system 100. The total power output of the vehicle system 700 can be redistributed between the consists 702, 708 and/or within the consist 708 so that the entire vehicle system 700 travels through and exits the area 104 within a designated time period and/or with at least a designated speed and/or power output, as described above.

Figure 10:
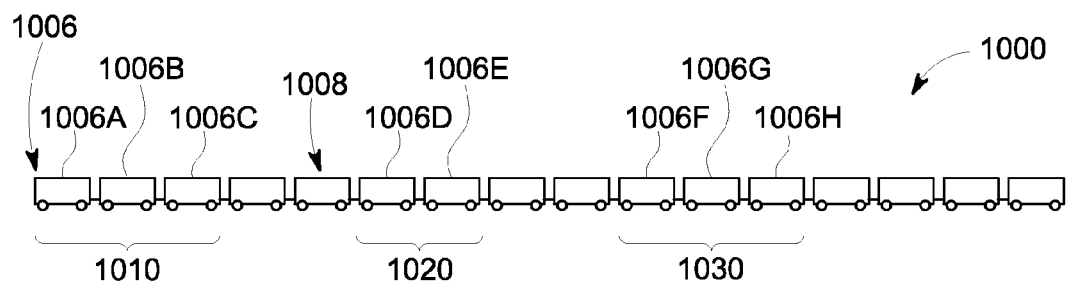
FIG. 10 is a schematic diagram of another embodiment of a vehicle system.

FIG. 10 is a schematic diagram of another embodiment of a vehicle system 1000. The vehicle system 1000 may be similar to the vehicle system 100 (shown in FIG. 1) in that the vehicle system 1000 includes several propulsion-generating vehicles 1006 (e.g., the vehicles 1006A-H) connected with several non-propulsion generating vehicles 1008. The propulsion-generating vehicles 1006 may be similar to the propulsion-generating vehicles 106 (shown in FIG. 1) and the non-propulsion generating vehicles 1008 may be similar to the non-propulsion generating vehicles 108 (shown in FIG. 1). The propulsion-generating vehicles 106 are arranged into three consists 1010, 1020, 1030. The number of propulsion-generating vehicles 1006, non-propulsion generating vehicles 1008, and consists 1010, 1020, 1030 are provided merely as examples and are not intended to be limiting on all embodiments of the inventive subject matter.

In one embodiment, the operations of the consists 1010, 1020, 1030 can be coordinated with each other in order to propel the vehicle system 1000 through the airflow restricted area 104 shown in FIG. 1 within a designated time period and/or such that the system 1000 exits the area 104 with at least a designated speed and/or total power output. For example, the vehicle system 1000 can coordinate the individual power outputs provided by the propulsion-generating vehicles 1006 in the consists 1010, 1020, 1030 when the consists 1010, 1020, 1030 approach, travel within (e.g., with all of the consists 1010, 1020, 1030 inside the area 104), and/or exit the area 104 in a manner that is similar to the coordination of efforts of the propulsion-generating vehicles 106 of the vehicle system 100.

As described above in connection with the method 200 shown in FIG. 2, the designated power output 310 (shown in FIG. 3) for the vehicle system 1000 can be determined as the vehicle system 1000 approaches, travels within, and exits the airflow restricted area 104. A total power output 300 (shown in FIG. 3) that is at least as large as the designated power output 310 may then be distributed and/or redistributed among the consists 1010, 1020, 1030 during travel toward, within, and exiting from the area 104 in a manner similar to the distribution and redistribution of the total power output 300 among the propulsion-generating vehicles 106 in the single consist of the vehicle system 100 described above in connection with the method 200.

For example, the propulsion-generating vehicles 1006 in the leading consist 1010 can provide the power outputs 302 (shown in FIG. 3) provided by the leading propulsion-generating vehicle 106A of the vehicle system 100 in the example of FIG. 3, the propulsion-generating vehicles 1006 in the middle consist 1020 can provide the power outputs 304 (shown in FIG. 3) provided by the middle propulsion-generating vehicle 106B of the vehicle system 100 in the example of FIG. 3, and the propulsion-generating vehicles 1006 in the trailing consist 1030 can provide the power outputs 306 (shown in FIG. 3) provided by the trailing propulsion-generating vehicle 106C of the vehicle system 100 in the example of FIG. 3. The power outputs 302, 304, 306 of the consists 1010, 1020, 1030 can be redistributed among the consists 1010, 1020, 1030 due to derating of the propulsion-generating vehicles 106 in one or more of the consists 1010, 1020, 1030, as described above.

Additionally or alternatively, the power outputs 302, 304, 306 provided by the consists 1010, 1020, 1030 can represent the aggregate or summed total of the power outputs provided by the propulsion-generating vehicles 1006 in each consist 1010, 1020, 1030. For example, the power output 302 generated by the consist 1010 can represent the aggregate of power outputs provided by the propulsion-generating vehicles 1006A-C, the power output 304 generated by the consist 1020 can represent the aggregate of power outputs provided by the propulsion-generating vehicles 1006D-E, and the power output 306 generated by the consist 1030 can represent the aggregate of power outputs provided by the propulsion-generating vehicles 1006F-H. Within each consist 1010, 1020, 1030, the power outputs provided by the individual propulsion-generating vehicles 1006 also can be distributed and/or redistributed as the vehicle system 1000 approaches, travels within, and/or exits the airflow restricted area 104. For example, the power outputs 302 of the consist 1010 can be distributed among the propulsion-generating vehicles 1006A-C can be distributed and redistributed as the consist 1010 travels through the area 104 in a similar manner in which the total power output 300 is distributed and redistributed among the propulsion-generating vehicles 106A-C of the vehicle system 100.

Figure 11:
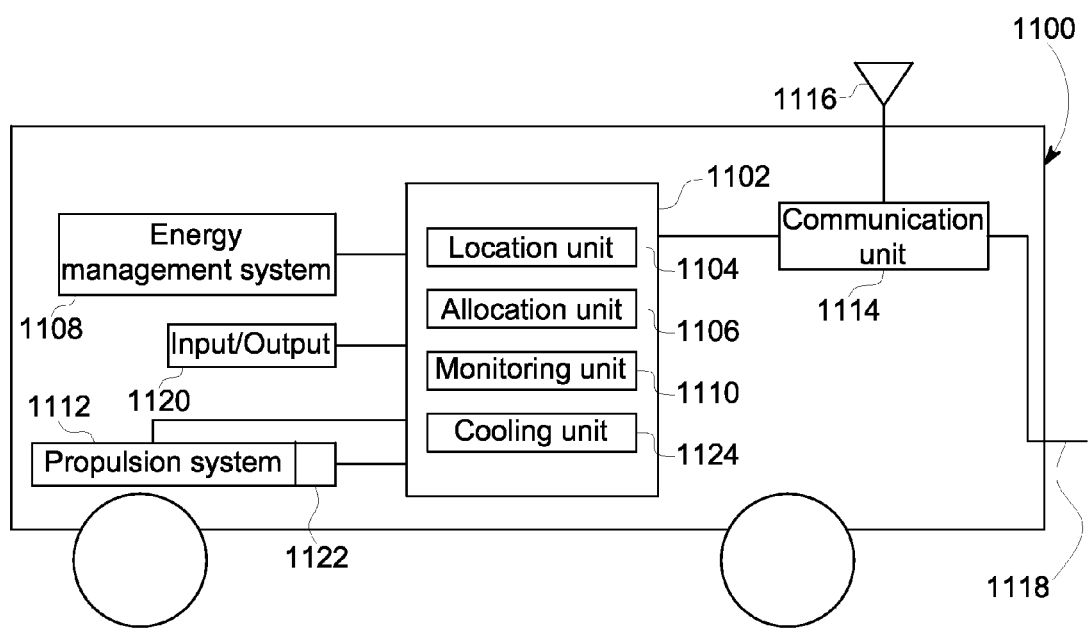
FIG. 11 is a schematic diagram of one embodiment of a propulsion-generating vehicle.

FIG. 11 is a schematic diagram of one embodiment of a propulsion-generating vehicle 1100. The propulsion-generating vehicle 1100 may represent one or more of the propulsion-generating vehicles 106, 704, 1006 shown in FIGS. 1, 7, and 10. The vehicle 1100 includes a propulsion system 1112, which can represent one or more engines, motors, brakes, batteries, cooling systems (e.g., radiators, fans, etc.), and the like, that operate to generate power output to propel the vehicle 1100. One or more input and/or output devices 1120 ("Input/Output 1120" in FIG. 11), such as keyboards, throttles, switches, buttons, pedals, microphones, speakers, displays, and the like, may be used by an operator to provide input and/or monitor output of one or more systems of the vehicle 1100. One or more sensors 1122 may be operatively connected with the propulsion system 1112 in order to obtain data representative of operational parameters of the propulsion system 1112. For example, the sensors 1122 may measure data that is representative of lubricant temperature of the propulsion system 1112 (e.g., engine oil temperature), coolant temperature of the cooling system in the propulsion system 1112 (e.g., water temperature), an actual power output of the propulsion system 1112, and the like. Additionally or alternatively, the propulsion system 1112 can include electric components that power motors to propel the vehicle 1100 using electric energy obtained from an onboard storage device (e.g., batteries) and/or from an off-board source (e.g., a catenary and/or electrified rail), such as transformers, converters, inverters, and the like.

The vehicle 1100 includes an onboard control system 1102 that controls operations of the vehicle 1100. Alternatively, the control system 1102 may entirely or partially be disposed off-board the vehicle 1100. A vehicle system or consist may include only a single propulsion-generating vehicle that includes the control system 1102 as described herein. The other propulsion-generating vehicles in the vehicle system and/or consist may be controlled based on instructions received from the propulsion-generating vehicle 1100 that has the control system 1102. Alternatively, several propulsion-generating vehicles 1100 may include the control systems 1102 and assigned priorities among the control systems 1102 may be used to determine which control system 1102 controls operations of the propulsion-generating vehicles 1100. For example, an overall vehicle control system may include two or more of the control systems 1102 disposed onboard different propulsion-generating vehicles 1100 that communicate with each other to coordinate operations of the vehicles 1100 as described herein.

The control system 1102 includes units that perform various operations. The control system 1102 and one or more of the units may represent a hardware and/or software system that operates to perform one or more functions described herein. For example, the control system 1102 and/or the illustrated units may include one or more computer processor(s), controller(s), or other logic-based device(s) that perform operations based on instructions stored on a tangible and non-transitory computer readable storage medium. Alternatively, the control system 1102 and/or the units may include one or more hard-wired devices that perform operations based on hard-wired logic of the devices. The control system 1102 and/or the units shown in FIG. 11 may represent the hardware that operates based on software or hardwired instructions, the software that directs hardware to perform the operations, or a combination thereof.

The control system 1102 includes a location unit 1104 that determines when a vehicle system (e.g., the vehicle system 100, 700, and/or 1000 shown in FIGS. 1, 7, and 10) that includes the vehicle 1100 is approaching the entrance 110 (shown in FIG. 1) to the airflow restricted area 104 (shown in FIG. 1). In one embodiment, the location unit 1104 includes or is communicatively coupled (e.g., via one or more wired and/or wireless connections) with a location determining device, such as a Global Positioning System receiver, that obtain location data representative of the location of the vehicle 1100. The location unit 1104 can use this data to determine the location of the vehicle 1100 as the vehicle 1100 moves. Alternatively or additionally, the location unit 1104 may calculate or estimate the location of the vehicle 1100 based on speeds of the vehicle 1100 and a time elapsed since the vehicle 1100 passed a known location. In another embodiment, the location unit 1104 may determine the location of the vehicle 1100 using another technique, such as by communicating information with wayside transponders or other devices, receiving input from an operator of the vehicle 1100, or the like. The location unit 1104 can determine locations of the vehicle 1100 in order to determine when the vehicle system that includes the vehicle 1100 approaches the entrance 110 and/or exit 112 (shown in FIG. 1) of the airflow restricted area 104, as described above. Alternatively, the location unit 1104 may be disposed onboard another propulsion-generating vehicle or another non-propulsion generating vehicle of the same vehicle system that includes the propulsion-generating vehicle 1100. The relative locations between the front, first, or leading vehicle in the vehicle system and the vehicle that includes the location unit 1104 may be known such that the determined location of the vehicle having the location unit 1104 may be converted into the location of the front, first, or leading vehicle in the vehicle system.

The control system 1102 also includes an allocation unit 1106 that determines a distribution (and/or redistribution) a total power output of a vehicle system or a consist that includes the vehicle 1100. For example, the allocation unit 1106 can determine or receive the total power output 300 (shown in FIG. 3) for a vehicle system or consist that includes the vehicle 1100. The allocation unit 1106 may then divide up the total power output 300 among the vehicle 1100 and one or more other propulsion-generating vehicles in the same vehicle system or consist, similar to as described above in connection with FIGS. 2 and 3.

The distribution of the total power output 300 among several propulsion-generating vehicles 1100 can be determined by the allocation unit 1106 based on relative positions of the propulsion-generating vehicles 1100. As described above, the allocation unit 1106 can increase the power output from one or more propulsion-generating vehicles 1100 that trail one or more other propulsion-generating vehicles 1100 on entry into the airflow restricted area 104 and/or decrease the power output from the leading propulsion-generating vehicles 1100. The amount of increase or decrease in power outputs can be based on a variety of factors, such as locations of the vehicles 1100 (with the leading vehicles 1100 having power outputs that are decreased more than trailing or middle vehicles 1100), the size of the vehicle system (e.g., the decreases in power output being less for heavier and/or longer vehicles), the health of the vehicles 1100, environmental conditions (e.g., wind speed, condensation, rain, snow, conditions of the route 102, etc.) and the like.

The allocation unit 1106 can determine the total power output 300 from input that is provided from an operator of the vehicle 1100, from an off-board location (e.g., a dispatch or remote control facility), and/or from a trip plan. In the illustrated embodiment, the control system 1102 is communicatively coupled with an energy management system 1108 that can create and/or obtain the trip plan. The energy management system 1108 may represent a hardware and/or software system that operates to perform one or more functions described herein. For example, the energy management system 1108 may include one or more computer processor(s), controller(s), or other logic-based device(s) that perform operations based on instructions stored on a tangible and non-transitory computer readable storage medium. Alternatively, energy management system 1108 may include one or more hard-wired devices that perform operations based on hard-wired logic of the devices. The energy management system 1108 shown in FIG. 11 may represent the hardware that operates based on software or hardwired instructions, the software that directs hardware to perform the operations, or a combination thereof.

The energy management system 1108 can create and/or receive the trip plan (e.g., from an off-board location) and the allocation unit 1106 can refer to the trip plan in order to determine the designated power output 310 for travel through the airflow restricted area 104, the designated speed for travel upon exiting the area 104, and/or the power output for travel upon exiting the area 104. The allocation unit 1106 can then determine the total power output 300 and/or the distribution of the total power output 300 in order to ensure that the total power output 300 is no less than the designated power output 310, and/or that the vehicle system has sufficient speed and/or power upon exiting the area 104, as described above.

Alternatively or additionally, the allocation unit 1106 can determine the designated power output 310 from a schedule of the vehicle system that includes the vehicle 1106. For example, the allocation unit 1106 can calculate or estimate the total power output 300 that is necessary or useful to propel the vehicle system through the airflow restricted area 104 within a designated time period that is derived from the schedule of the vehicle system (e.g., a time period that keeps the vehicle system on schedule). The schedule can be provided to the allocation unit 1106 from an operator of the vehicle 1100 and/or from an off-board location.

The control system 1102 includes a monitoring unit 1110 that examines the actual power output of the propulsion-generating vehicle 1100 and/or one or more other propulsion-generating vehicles 1100 in the same vehicle system or consist. For example, the monitoring unit 1110 can monitor changes in the actual power output that is provided by the propulsion system 1112 of the vehicle 1100 and/or actual power outputs of propulsion systems 1112 of other vehicles 1100.

The monitoring unit 1110 can track the power outputs of one or more propulsion-generating vehicles 1100 in a vehicle system and/or consist to determine when one or more of the vehicles 1100 derate in the airflow restricted area 104, as described above. For example, the monitoring unit 1110 can determine when the power outputs provided by one or more of the vehicles 1100 decrease by at least a designated percentage, by at least a designated amount, and/or below a designated amount during travel in the airflow restricted area 104.

The monitoring unit 1110 can notify the allocation unit 1106 when one or more of the propulsion-generating vehicles 1100 in a vehicle system or consist derates. The allocation unit 1106 can then redistribute the total power output 300 of the vehicle system and/or consist among the propulsion-generating vehicles 1100. As described above, the distribution and redistribution of the total power output 300 can be performed such that the vehicle system travels through and exits from the airflow restricted area 104 within a designated time period, with at least a designated speed, and/or with at least a designated power output upon exit from the area 104.

In one embodiment, the allocation unit 1106 can control the derating speed of one or more propulsion-generating vehicles 1100 in a vehicle system or consist. For example, the allocation unit 1106 can increase or decrease the rate at which the power output provided by one or more vehicles 1100 changes, as described above.

The control system 1102 includes a cooling unit 1124 that monitors operational parameters of the vehicle 1100 (and/or one or more other vehicles 1100 in the same vehicle system and/or consist) and that can initiate cooling operations of the propulsion systems 1112 of one or more of the vehicles 1100. The cooling unit 1124 can monitor the operational parameters (e.g., temperatures and/or temperature differences) of the onboard propulsion system 1112 from the sensors 1122 and/or the operational parameters of the propulsion systems 1112 of other vehicles 1100 via a communication unit 1114 (described below). If the operational parameters are outside of one or more limits, then the cooling unit 1124 can take responsive actions. For example, if the lubricant and/or oil temperatures of a propulsion system 1112 exceed one or more limits, then the cooling unit 1124 can warn the operation and/or autonomously direct the propulsion system 1112 to reduce the power output being generated by the propulsion system 1112 (e.g., cause the derating of a vehicle 1100).

In one embodiment, the cooling unit 1124 initiates cooling of the propulsion system 1112 of one or more vehicles 1100 when the vehicle system approaches the entrance 110 to the airflow restricted area 104. For example, when the vehicle system is within a designated distance from the entrance 110, the cooling unit 1124 can increase a speed at which a fan or blower moves air over components of the propulsion system 1112 to cool the components. The cooling unit 1124 can initiate this cooling prior to entering the area 104 so that the one or more propulsion-generating vehicles 1100 take longer to derate and/or are slower to derate upon entering and traveling in the airflow restricted area 104.

The cooling unit 1124 may change one or more limits on operating parameters of the propulsion system 1122 in response to the vehicle system approaching the exit 112 of the airflow restricted area 104. For example, the cooling unit 1124 may increase a coolant temperature limit, a lubricant temperature limit, and/or a limit on a temperature difference between the coolant temperature and the lubricant temperature when the location unit 1104 determines that the vehicle system that includes the vehicle 1100 is approaching the exit 112. As described above, increasing these limits can allow the propulsion system 1122 to increase power output so that the vehicle 1100 can more quickly cool the propulsion system 1122 upon exiting the area 104.

The control system 1102 is communicatively coupled with the communication unit 1114. The communication unit 1114 can communicate with an off-board location, such as another vehicle, a dispatch facility, another vehicle system, or the like. The communication unit 1114 can communicate via wired and/or wireless connections (e.g., via radio frequency). The communication unit 1114 can include a wireless antenna 1116 and associated circuitry and software to communicate wirelessly. Additionally or alternatively, the communication unit 1114 may be connected with a wired connection 1118, such as one or more buses, cables, and the like, that connect the communication unit 1114 with another vehicle in the vehicle system or consist (e.g., a trainline, multiple unit cable, electronically controlled pneumatic brake line, or the like). The communication unit 1114 can be used to transmit a variety of information described herein, such as the power outputs that the allocation unit 1106 directs other propulsion-generating vehicles to provide when the total power output is distributed or redistributed, the actual power outputs generated by other propulsion-generating vehicles (e.g., to identify derating), operational parameters (e.g., lubricant and/or water temperatures) and the like. Additionally or alternatively, the communication unit 1114 can be used to receive information such as a power output that the vehicle 1100 that includes the communication unit 1114 is to generate (when the allocation unit 1106 on another vehicle 1100 is distributing and/or redistributing the total power 300). The communication unit 1114 can be used to receive actual power outputs generated by other propulsion-generating vehicles (e.g., to identify derating), trip plans, the designated time periods in which to pass through the airflow restricted area 104, the designated speeds at which to exit the airflow restricted area 104, the designated power output 310, a total power output to be generating upon exit from the airflow restricted area 104, the location of the vehicle system, the location of the airflow restricted area 104 (and/or the entrance 110 and/or exit 112 thereto), operating parameters of other propulsion-generating vehicles, and the like.

In one embodiment, a method (e.g., for controlling a vehicle system traveling along a route that includes an airflow restricted area) includes determining when the vehicle system is approaching an entrance to the airflow restricted area. The vehicle system includes at least first and second propulsion-generating vehicles interconnected with each other. The method also includes distributing a total power output of the vehicle system among at least the first and second propulsion-generating vehicles as the vehicle system approaches the entrance of the airflow restricted area. The total power output is distributed by at least one of directing the first propulsion-generating vehicle to decrease power output generated by the first propulsion-generating vehicle relative to a power output generated by the second propulsion-generating vehicle or directing the second propulsion-generating vehicle to increase the power output generated by the second propulsion-generating vehicle relative to the power output generated by the first propulsion-generating vehicle. The method further includes monitoring the power output generated by the second propulsion-generating vehicle during travel of the vehicle system in the airflow restricted area to determine when the second propulsion-generating vehicle derates and redistributing the total power output of the vehicle system among the at least the first and second propulsion-generating vehicles as the vehicle system travels in the airflow restricted area and responsive to the second propulsion-generating vehicle derating. The distributing and redistributing of the total power output of the vehicle system causes the vehicle system to travel through and exit from the airflow restricted area at least one of within a designated time period, with at least a designated speed, or with at least a designated power output.

In one aspect, the method also includes determining an available amount of power output from the vehicle system.

The total power output can be determined based on the available amount of power output from the vehicle system.

In one aspect, the first propulsion-generating vehicle is disposed ahead of the second propulsion-generating vehicle along a direction of travel of the vehicle system.

In one aspect, the airflow restricted area includes at least one of a tunnel or a ravine through which the route passes.

In one aspect, the airflow restricted area includes a volume through which the route passes that has at least one of a reduced supply of oxygen capable of being combusted by one or more engines of the vehicle system or a reduced airflow capable of cooling one or more components of the vehicle system when the vehicle system travels through the volume relative to one or more locations that are outside of the airflow restricted area.

In one aspect, the method also includes determining the total power output based on one or more restrictions on operation of the vehicle system, the one or more restrictions including at least one of a lower speed limit, an upper speed limit, an audible noise limitation, a limit on an amount of electric energy stored onboard the vehicle system, or a limit on an amount of at least one of electric current or voltage that is available from an off-board source.

In one aspect, the total power output is based on an upper speed limit associated with travel within the airflow restricted area, and the total power output is distributed and redistributed while maintaining a speed of the vehicle system at or below the upper speed limit.

In one aspect, the total power output is based on a lower speed limit associated with travel within the airflow restricted area, and the total power output is distributed and redistributed while maintaining a speed of the vehicle system at or above the lower speed limit.

In one aspect, the total power output is based on a heat rejection capability of one or more electric circuit components of the vehicle system that supply electric current to propel the vehicle system.

In one aspect, the total power output is based on a health of one or more of the first or second propulsion-generating vehicles of the vehicle system.

In one aspect, at least one of the designated time period, the designated speed, or the designated power output is determined from a trip plan that designates operational settings of the vehicle system as a function of at least one of time elapsed or distanced traveled during a trip along the route, and wherein the vehicle system traveling along the route using the operational settings that are designated by the trip plan causes the vehicle system to reduce at least one of fuel consumed or emissions generated by the vehicle system relative to the vehicle system traveling the trip along the route according to one or more different operational settings.

In one aspect, at least one of the designated time period, the designated speed, or the designated power output is determined from a schedule of the vehicle system.

In one aspect, the vehicle system includes an intermediate propulsion-generating vehicle disposed between the first and second propulsion-generating vehicles. Distributing the total power output of the vehicle system includes directing the first propulsion-generating vehicle to decrease the power output generated by the first propulsion-generating vehicle more than a power output generated by the intermediate propulsion-generating vehicle is decreased and directing the intermediate propulsion-generating vehicle to maintain the power output generated by the intermediate propulsion-generating vehicle above the power output generated by the second propulsion-generating vehicle.

In one aspect, the method also includes controlling a derating speed at which the power output generated by the second propulsion-generating vehicle is derated during travel of the vehicle system in the airflow restricted area by limiting the power output that is generated by the second propulsion-generating vehicle.

In one aspect, the derating speed is based on a distance that the route extends through the airflow restricted area. The derating speed is increased for shorter distances that the route extends through the airflow restricted area and decreased for longer distances that the route extends through the airflow restricted area.

In one aspect, the derating speed is based on a separation distance between an exit of the airflow restricted area and an entrance of one or more additional airflow restricted areas through which the route extends. The derating speed is decreased for smaller separation distances and increased for larger separation distances.

In one aspect, the derating speed is based on a grade of the route that exits from the airflow restricted area along a direction of travel of the vehicle system. The derating speed is decreased for smaller grades and increased for larger grades.

In one aspect, the method also includes cooling a propulsion system of the first propulsion-generating vehicle responsive to determining that the vehicle system is approaching the entrance to the airflow restricted area. The cooling may be initiated prior to the vehicle system and/or the first propulsion-generating vehicle entering the airflow restricted area.

In one aspect, the first propulsion-generating vehicle is associated with at least one of a coolant temperature limit of a cooling system of the first propulsion-generating vehicle, a lubricant temperature limit of an engine of the first propulsion-generating vehicle, or a limit on a temperature difference between a temperature of a coolant of the cooling system and a temperature of lubricant of the engine. The method can also include increasing at least one of the coolant temperature limit, the lubricant temperature limit, or the limit on the temperature difference while the vehicle system is in the airflow restricted area and responsive to the vehicle system approaching an exit of the airflow restricted area.

In one embodiment, a control system (e.g., for controlling operations of a vehicle system) is provided. The control system includes a location unit that is configured to determine when a vehicle system is approaching an entrance to an airflow restricted area along a route. The vehicle system has at least first and second propulsion-generating vehicles that are interconnected with each other. The control system also includes an allocation unit configured to distribute a total power output of the vehicle system among at least the first and second propulsion-generating vehicles in response to determining that the vehicle system is approaching the entrance to the airflow restricted area. The total power output is distributed by at least one of directing the first propulsion-generating vehicle to decrease a power output generated by the first propulsion-generating vehicle relative to a power output that is generated by the second propulsion-generating vehicle or directing the second propulsion-generating vehicle to reduce a power output generated by the second propulsion-generating vehicle relative to the power output generated by the first propulsion-generating vehicle. The control system also includes a monitoring unit configured to determine when the second propulsion-generating vehicle derates during travel of the vehicle system in the airflow restricted area based on one or more decreases in the power output generated by the second propulsion-generating vehicle. The allocation unit also configured to redistribute the total power output of the vehicle system among at least the first and second propulsion-generating vehicles as the vehicle system travels in the airflow restricted area and responsive to the monitoring unit determining that the power output generated the second propulsion-generating vehicle is derating. The allocation unit is configured to distribute and redistribute the total power output of the vehicle system such that the vehicle system travels through and exit from the airflow restricted area at least one of within a designated time period, with at least a designated speed, within a designated speed range, with at least a designated power output, or within a designated power output range.

In one aspect, the allocation unit is configured to determine an available amount of power output from the vehicle system and determine the total power output based on the available amount of power output from the vehicle system.

In one aspect, the first propulsion-generating vehicle is disposed ahead of the second propulsion-generating vehicle along a direction of travel of the vehicle system.

In one aspect, the airflow restricted area includes at least one of a tunnel or a ravine through which the route passes.

In one aspect, the airflow restricted area includes a volume through which the route passes that has at least one of a reduced supply of oxygen capable of being combusted by one or more engines of the vehicle system when the vehicle system travels through the volume or a reduced airflow capable of cooling one or more components of the vehicle system relative to one or more locations that are outside of the airflow restricted area.

In one aspect, at least one of the designated time period or the total power output is determined from a trip plan that designates operational settings of the vehicle system as a function of at least one of time elapsed or distanced traveled during a trip along the route. When the vehicle system travels along the route using the operational settings that are designated by the trip plan causes the vehicle system, the vehicle system reduces at least one of fuel consumed or emissions generated relative to the vehicle system traveling the trip along the route according to one or more different operational settings.

In one aspect, at least one of the designated time period or the total power output is determined from a schedule of the vehicle system.

In one aspect, the total power output is based on an upper speed limit associated with travel within the airflow restricted area, and the total power output is distributed and redistributed while maintaining a speed of the vehicle system at or below the upper speed limit.

In one aspect, the total power output is based on a lower speed limit associated with travel within the airflow restricted area, and the total power output is distributed and redistributed while maintaining a speed of the vehicle system at or above the lower speed limit.

In one aspect, the total power output is based on a heat rejection capability of one or more electric circuit components of the vehicle system that supply electric current to propel the vehicle system.

In one aspect, the total power output is based on a health of one or more of the first or second propulsion-generating vehicles of the vehicle system.

In one aspect, the allocation unit is configured to distribute the total power output of the vehicle system by directing the first propulsion-generating vehicle to decrease the power output generated by the first propulsion-generating vehicle and directing the second propulsion-generating vehicle to increase the power output generated by the second propulsion-generating vehicle as the vehicle system approaches the entrance to the airflow restricted area.

In one aspect, the vehicle system includes an intermediate propulsion-generating vehicle disposed between the first and second propulsion-generating vehicles. The allocation unit is configured to distribute the total power output of the vehicle system by directing the first propulsion-generating vehicle to decrease the power output generated by the first propulsion-generating vehicle more than a power output generated by the intermediate propulsion-generating vehicle is decreased and by directing the intermediate propulsion-generating vehicle to maintain the power output generated by the intermediate propulsion-generating vehicle above the power output generated by the second propulsion-generating vehicle.

In one aspect, the allocation unit is configured to determine the total power output based on one or more restrictions on operation of the vehicle system, the one or more restrictions including at least one of a lower speed limit, an upper speed limit, an audible noise limitation, a limit on an amount of electric energy stored onboard the vehicle system, or a limit on an amount of at least one of electric current or voltage that is available from an off-board source.

In one aspect, the allocation unit is configured to control a derating speed at which the power output generated by the second propulsion-generating vehicle decreases during travel of the vehicle system in the airflow restricted area by controlling a demand for the power output generated by the second propulsion-generating vehicle.

In one aspect, the derating speed is based on a distance that the route extends through the airflow restricted area. The allocation unit is configured to increase the derating speed for shorter distances that the route extends through the airflow restricted area and decrease the derating speed for longer distances that the route extends through the airflow restricted area.

In one aspect, the derating speed is based on a separation distance between an exit of the airflow restricted area and an entrance of one or more additional airflow restricted areas through which the route extends. The allocation unit is configured to decrease the derating speed for smaller separation distances and increase the derating speed for larger separation distances.

In one aspect, the derating speed is based on a grade of the route that exits from the airflow restricted area along a direction of travel of the vehicle system. The allocation unit is configured to decrease the derating speed for smaller grades and increase the derating speed for larger grades.

In one aspect, the control system also includes a cooling unit configured to initiate cooling of a propulsion system of the first propulsion-generating vehicle responsive to the location unit determining that the vehicle system is approaching the entrance to the airflow restricted area.

In one aspect, the first propulsion-generating vehicle is associated with at least one of a coolant temperature limit of a cooling system of the first propulsion-generating vehicle, a lubricant temperature limit of an engine of the first propulsion-generating vehicle, or a limit on a temperature difference between a temperature of a coolant and a temperature of the lubricant. The control system can include a cooling unit configured to increase at least one of the coolant temperature limit, the lubricant temperature limit, or the limit on the temperature difference while the vehicle system is in the airflow restricted area responsive to the location unit determining that the vehicle system is approaching an exit of the airflow restricted area.

In one embodiment, a system (e.g., for controlling a vehicle system) includes a first control system configured to be disposed onboard a first propulsion-generating vehicle of the vehicle system and a second control system configured to be disposed onboard a second propulsion-generating vehicle of the vehicle system. The first and second propulsion-generating vehicles are interconnected with each other in the vehicle system. The first control system is configured to determine when the vehicle system is approaching an entrance to an airflow restricted area along a route and to distribute a total power output of the vehicle system among the first and second propulsion-generating vehicles in response thereto. The total power output is distributed by the first control system decreasing a power output generated by the first propulsion-generating vehicle and by directing the second control system to maintain a power output generated by the second propulsion-generating vehicle above the power output generated by the first propulsion-generating vehicle. At least one of the first or second control system is configured to determine when the power output generated by the second propulsion-generating vehicle decreases due to derating of a propulsion system of the second propulsion-generating vehicle during travel of the vehicle system in the airflow restricted area. The first control system also is configured to redistribute the total power output of the vehicle system among the first and second propulsion-generating vehicles as the vehicle system travels in the airflow restricted area and responsive to determining that the power output generated by the second propulsion-generating vehicle is decreasing due to derating of the propulsion system. The first control system is configured to distribute and redistribute the total power output of the vehicle system such that the vehicle system travels through and exit from the airflow restricted area within a designated time period.

In one aspect, the airflow restricted area includes at least one of a tunnel or a ravine through which the route passes.

In one aspect, the airflow restricted area includes a volume through which the route passes that has a reduced supply of oxygen capable of being combusted by one or more engines of the vehicle system when the vehicle system travels through the volume relative to one or more locations that are outside of the airflow restricted area.

In one aspect, at least one of the designated time period or the total power output is determined from a trip plan that designates operational settings of the vehicle system as a function of at least one of time elapsed or distanced traveled during a trip along the route. When the vehicle system travels along the route using the operational settings that are designated by the trip plan, the vehicle system reduces at least one of fuel consumed or emissions generated relative to the vehicle system traveling the trip along the route according to one or more different operational settings.

In one aspect, at least one of the designated time period or the total power output is determined from a schedule of the vehicle system.

In one aspect, the first control system is configured to distribute the total power output of the vehicle system by decreasing the power output generated by the first propulsion-generating vehicle and increasing the power output generated by the second propulsion-generating vehicle as the vehicle system approaches the entrance to the airflow restricted area.

In one aspect, the vehicle system includes a middle propulsion-generating vehicle disposed between the first and second propulsion-generating vehicles. The first control system is configured to distribute the total power output of the vehicle system by decreasing the power output generated by the first propulsion-generating vehicle more than a power output generated by the middle propulsion-generating vehicle is decreased and by maintaining the power output generated by the middle propulsion-generating vehicle above the power output generated by the second propulsion-generating vehicle.

In one aspect, the first control system is configured to control a derating speed at which the power output generated by the second propulsion-generating vehicle decreases during travel of the vehicle system in the airflow restricted area by controlling a demand for the power output generated by the second propulsion-generating vehicle.

In one aspect, the derating speed is based on a distance that the route extends through the airflow restricted area. The first control system is configured to increase the derating speed for shorter distances that the route extends through the airflow restricted area and decrease the derating speed for longer distances that the route extends through the airflow restricted area.

In one aspect, at least one of the first control system or the second control system is configured to determine an available amount of power output from the vehicle system. The total power output is determined based on the available amount of power output from the vehicle system.

In one aspect, at least one of the first control system or the second control system is configured to determine the total power output based on one or more restrictions on operation of the vehicle system, the one or more restrictions including at least one of a lower speed limit, an upper speed limit, an audible noise limitation, a limit on an amount of electric energy stored onboard the vehicle system, or a limit on an amount of at least one of electric current or voltage that is available from an off-board source.

In one embodiment, a method (e.g., for controlling a vehicle system) includes determining when a vehicle system traveling along a route is approaching an entrance to an airflow restricted area. The vehicle system includes at least first and second propulsion-generating vehicles that are interconnected with each other. The method also includes, as the vehicle system approaches the entrance of the airflow restricted area, at least one of directing the first propulsion-generating vehicle to decrease power output generated by the first propulsion-generating vehicle relative to a power output generated by the second propulsion-generating vehicle or directing the second propulsion-generating vehicle to increase the power output generated by the second propulsion-generating vehicle relative to the power output generated by the first propulsion-generating vehicle. The method further includes determining when the second propulsion-generating vehicle derates during travel of the vehicle system in the airflow restricted area and, as the vehicle system travels in the airflow restricted area and responsive to the second propulsion-generating vehicle derating, changing the respective power outputs generated by the first and second propulsion-generating vehicles to cause the vehicle system to travel through and exit from the airflow restricted area at least one of within a designated time period, with at least a designated speed, within a designated speed range, with at least a designated power output, or within a designated power output range.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described systems and methods without departing from the spirit and scope of the inventive subject matter herein involved, it is intended that all of the subject matter of the above description or shown in the accompanying drawings shall be interpreted merely as examples illustrating the inventive concept herein and shall not be construed as limiting the inventive subject matter.

The invention claimed is:

1. A method comprising:
    determining when a vehicle system traveling along a route is approaching an entrance to an airflow restricted area, the vehicle system including at least first and second propulsion-generating vehicles that are interconnected with each other;
    distributing a total power output of the vehicle system among at least the first and second propulsion-generating vehicles as the vehicle system approaches the entrance of the airflow restricted area, the total power output distributed by at least one of directing the first propulsion-generating vehicle to decrease power output generated by the first propulsion-generating vehicle relative to a power output generated by the second propulsion-generating vehicle or directing the second propulsion-generating vehicle to increase the power output generated by the second propulsion-generating vehicle relative to the power output generated by the first propulsion-generating vehicle;
    monitoring the power output generated by the second propulsion-generating vehicle during travel of the vehicle system in the airflow restricted area to determine when the second propulsion-generating vehicle derates;
    redistributing the total power output of the vehicle system among the at least first and second propulsion-generating vehicles as the vehicle system travels in the airflow restricted area and responsive to the second propulsion-generating vehicle derating; and
    controlling a derating speed at which the power output generated by the second propulsion-generating vehicle is derated during travel of the vehicle system in the airflow restricted area by limiting the power output that is generated by the second propulsion-generating vehicle, wherein the derating speed is a rate at which the power output generated by the second-propulsion-generating vehicle decreases due to derating, and wherein the derating speed is based on one or more of:
        a distance that the route extends through the airflow restricted area, the derating speed increased for shorter distances that the route extends through the airflow restricted area and decreased for longer distances that the route extends through the airflow restricted area;
        a separation distance between an exit of the airflow restricted area and an entrance of one or more additional airflow restricted areas through which the route extends, the derating speed decreased for smaller separation distances and increased for larger separation distances; or
        a grade of the route that exits from the airflow restricted area along a direction of travel of the vehicle system, the derating speed decreased for smaller grades and increased for larger grades.

2. The method of claim 1, further comprising determining an available amount of power output from the vehicle system, wherein the total power output is determined based on the available amount of power output from the vehicle system.

3. The method of claim 1, wherein the airflow restricted area includes at least one of a tunnel or a ravine through which the route passes.

4. The method of claim 1, wherein the first propulsion-generating vehicle is disposed ahead of the second propulsion-generating vehicle along a direction of travel of the vehicle system.

5. The method of claim 1, wherein the vehicle system includes an intermediate propulsion-generating vehicle disposed between the first and second propulsion-generating vehicles, and wherein distributing the total power output of the vehicle system includes directing the first propulsion-generating vehicle to decrease the power output generated by the first propulsion-generating vehicle more than a power output generated by the intermediate propulsion-generating vehicle is decreased and directing the intermediate propulsion-generating vehicle to maintain the power output generated by the intermediate propulsion-generating vehicle above the power output generated by the second propulsion-generating vehicle.

6. The method of claim 1, further comprising determining the total power output based on one or more restrictions on operation of the vehicle system, the one or more restrictions including at least one of a lower speed limit, an upper speed limit, an audible noise limitation, a limit on an amount of electric energy stored onboard the vehicle system, or a limit on an amount of at least one of electric current or voltage that is available from an off-board source.

7. The method of claim 1, wherein the derating speed is based on the distance that the route extends through the airflow restricted area, the derating speed increased for the shorter distances that the route extends through the airflow restricted area and decreased for the longer distances that the route extends through the airflow restricted area.

8. The method of claim 1, wherein the derating speed is based on the separation distance between the exit of the airflow restricted area and the entrance of the one or more additional airflow restricted areas through which the route extends, the derating speed decreased for the smaller separation distances and increased for the larger separation distances.

9. The method of claim 1, wherein the derating speed is based on the grade of the route that exits from the airflow restricted area along the direction of travel of the vehicle system, the derating speed decreased for the smaller grades and increased for the larger grades.

10. The method of claim 1, wherein the first propulsion-generating vehicle is associated with at least one of a coolant temperature limit of a cooling system of the first propulsion-generating vehicle, a lubricant temperature limit of an engine of the first propulsion-generating vehicle, or a limit on a temperature difference between a temperature of a coolant of the cooling system and a temperature of lubricant of the engine, and further comprising:
increasing at least one of the coolant temperature limit, the lubricant temperature limit, or the limit on the temperature difference while the vehicle system is in the airflow restricted area and responsive to the vehicle system approaching an exit of the airflow restricted area.

11. A control system comprising:
a location unit configured to determine when a vehicle system is approaching an entrance to an airflow restricted area along a route, the vehicle system having at least first and second propulsion-generating vehicles that are interconnected with each other;
an allocation unit configured to distribute a total power output of the vehicle system among at least the first and second propulsion-generating vehicles in response to determining that the vehicle system is approaching the entrance to the airflow restricted area, the total power output being distributed by at least one of directing the first propulsion-generating vehicle to decrease a power output generated by the first propulsion-generating vehicle relative to a power output that is generated by the second propulsion-generating vehicle or directing the second propulsion-generating vehicle to increase the power output generated by the second propulsion-generating vehicle relative to the power output generated by the first propulsion-generating vehicle; and
a monitoring unit configured to determine when the second propulsion-generating vehicle derates during travel of the vehicle system in the airflow restricted area based on one or more decreases in the power output generated by the second propulsion-generating vehicle,
wherein the allocation unit also is configured to redistribute the total power output of the vehicle system among at least the first and second propulsion-generating vehicles as the vehicle system travels in the airflow restricted area and responsive to the monitoring unit determining that the second propulsion-generating vehicle is derating,
wherein the allocation unit is configured to control a derating speed at which the power output generated by the second propulsion-generating vehicle is derated during travel of the vehicle system in the airflow restricted area by limiting the power output that is generated by the second propulsion-generating vehicle, wherein the derating speed is a rate at which the power output generated by the second-propulsion-generating vehicle decreases due to derating, and the allocation unit configured to control the derating speed based on one or more of:
a distance that the route extends through the airflow restricted area, the allocation unit configured to increase the derating speed for shorter distances that the route extends through the airflow restricted area and to decrease the derating speed for longer distances that the route extends through the airflow restricted area;
a separation distance between an exit of the airflow restricted area and an entrance of one or more additional airflow restricted areas through which the route extends, the allocation unit configured to decrease the derating speed for smaller separation distances and to increase the derating speed for larger separation distances; or
a grade of the route that exits from the airflow restricted area along a direction of travel of the vehicle system, the allocation unit configured to decrease the derating speed for smaller grades and to increase the derating speed for larger grades.

12. The control system of claim 11, wherein the allocation unit is configured to determine an available amount of power output from the vehicle system, and wherein the allocation unit is configured to determine the total power output based on the available amount of power output from the vehicle system.

13. The control system of claim 11, wherein the airflow restricted area includes a volume through which the route passes that has at least one of a reduced supply of oxygen capable of being combusted by one or more engines of the vehicle system when the vehicle system travels through the volume or a reduced airflow capable of cooling one or more components of the vehicle system relative to one or more locations that are outside of the airflow restricted area.

14. The control system of claim 11, wherein the allocation unit is configured to distribute the total power output of the vehicle system by directing the first propulsion-generating vehicle to decrease the power output generated by the first propulsion-generating vehicle and directing the second propulsion-generating vehicle to increase the power output generated by the second propulsion-generating vehicle as the vehicle system approaches the entrance to the airflow restricted area.

15. The control system of claim 11, wherein the vehicle system includes an intermediate propulsion-generating vehicle disposed between the first and second propulsion-generating vehicles, and wherein the allocation unit is configured to distribute the total power output of the vehicle system by directing the first propulsion-generating vehicle to decrease the power output generated by the first propulsion-generating vehicle more than a power output generated by the intermediate propulsion-generating vehicle is decreased and by directing the intermediate propulsion-generating vehicle to maintain the power output generated by the intermediate propulsion-generating vehicle above the power output generated by the second propulsion-generating vehicle.

16. The control system of claim 11, wherein the allocation unit is configured to determine the total power output based on one or more restrictions on operation of the vehicle system, the one or more restrictions including at least one of a lower speed limit, an upper speed limit, an audible noise limitation, a limit on an amount of electric energy stored onboard the vehicle system, or a limit on an amount of at least one of electric current or voltage that is available from an off-board source.

17. The control system of claim 11, wherein the allocation unit is configured to control the derating speed at which the power output generated by the second propulsion-generating vehicle decreases during travel of the vehicle system in the airflow restricted area by controlling a demand for the power output generated by the second propulsion-generating vehicle.

18. The control system of claim 11, further comprising a cooling unit configured to initiate cooling of a propulsion system of the first propulsion-generating vehicle prior to the vehicle system entering the airflow restricted area and responsive to the location unit determining that the vehicle system is approaching the entrance to the airflow restricted area.

19. A system comprising:
a first control system configured to be disposed onboard a first propulsion-generating vehicle of a vehicle system; and
a second control system configured to be disposed onboard a second propulsion-generating vehicle of the vehicle system, the first and second propulsion-generating vehicles interconnected with each other in the vehicle system, the first propulsion-generating vehicle located at a leading end of the vehicle system relative to a direction of travel of the vehicle system and ahead of the second propulsion-generating vehicle in the vehicle system,
wherein the first control system is configured to determine when the vehicle system is approaching an entrance to an airflow restricted area along a route and to distribute a total power output of the vehicle system among the first and second propulsion-generating vehicles in response thereto, the total power output being distributed by the first control system decreasing a power output generated by the first propulsion-generating vehicle and by directing the second control system to maintain a power output generated by the second propulsion-generating vehicle above the power output generated by the first propulsion-generating vehicle,
wherein at least one of the first or second control system is configured to determine when the power output generated by the second propulsion-generating vehicle decreases due to derating of a propulsion system of the second propulsion-generating vehicle during travel of the vehicle system in the airflow restricted area,
wherein the first control system also is configured to redistribute the total power output of the vehicle system among the first and second propulsion-generating vehicles as the vehicle system travels in the airflow restricted area and responsive to determining that the power output generated by the second propulsion-generating vehicle is decreasing due to derating of the propulsion system, the first control system configured to distribute and redistribute the total power output of the vehicle system such that the vehicle system travels through and exit from the airflow restricted area within a designated time period.

20. The system of claim 19, wherein the airflow restricted area includes at least one of a tunnel or a ravine through which the route passes.

21. The system of claim 19, wherein at least one of the designated time period or the total power output is determined from a trip plan that designates operational settings of the vehicle system as a function of at least one of time elapsed or distanced traveled during a trip along the route, and wherein the vehicle system traveling along the route using the operational settings that are designated by the trip plan causes the vehicle system to reduce at least one of fuel consumed or emissions generated by the vehicle system relative to the vehicle system traveling the trip along the route according to one or more different operational settings.

22. The system of claim 19, wherein the first control system is configured to distribute the total power output of the vehicle system by decreasing the power output generated by the first propulsion-generating vehicle and increasing the power output generated by the second propulsion-generating vehicle as the vehicle system approaches the entrance to the airflow restricted area.

23. The system of claim 19, wherein at least one of the first control system or the second control system is configured to determine the total power output based on one or more restrictions on operation of the vehicle system, the one or more restrictions including at least one of a lower speed limit, an upper speed limit, an audible noise limitation, a limit on an amount of electric energy stored onboard the vehicle system, or a limit on an amount of at least one of electric current or voltage that is available from an off-board source.

24. A method comprising:
determining when a vehicle system traveling along a route is approaching an entrance to an airflow restricted area, the vehicle system including at least first and second propulsion-generating vehicles that are interconnected with each other with the first propulsion-generating vehicle located at a leading end of the vehicle system relative to a direction of travel of the vehicle system and ahead of the second propulsion-generating vehicle;
as the vehicle system approaches the entrance of the airflow restricted area, at least one of directing the first propulsion-generating vehicle to decrease power output generated by the first propulsion-generating vehicle relative to a power output generated by the second propulsion-generating vehicle or directing the second propulsion-generating vehicle to increase the power output generated by the second propulsion-generating vehicle relative to the power output generated by the first propulsion-generating vehicle;
determining when the second propulsion-generating vehicle derates during travel of the vehicle system in the airflow restricted area; and
as the vehicle system travels in the airflow restricted area and responsive to the second propulsion-generating vehicle derating, changing the respective power outputs generated by the first and second propulsion-generating vehicles to cause the vehicle system to travel through and exit from the airflow restricted area at least one of with at least a designated speed or within a designated speed range.

25. The method of claim 1, wherein distributing and redistributing the total power output of the vehicle system causes the vehicle system to travel through and exit from the airflow restricted area at least one of with at least a designated speed or within a designated speed range.

26. The control system of claim 11, wherein the allocation unit is configured to distribute and redistribute the total power output of the vehicle system such that the vehicle system travels through and exits from the airflow restricted area at least one of with at least a designated speed or within a designated speed range.

27. The system of claim 19, wherein the second control system is configured to control a derating speed at which the power output generated by the second propulsion-generating vehicle is derated during travel of the vehicle system in the airflow restricted area by limiting the power output that is generated by the second propulsion-generating vehicle, the allocation unit configured to control the derating speed based on one or more of:
- a distance that the route extends through the airflow restricted area, the allocation unit configured to increase the derating speed for shorter distances that the route extends through the airflow restricted area and to decrease the derating speed for longer distances that the route extends through the airflow restricted area;
- a separation distance between an exit of the airflow restricted area and an entrance of one or more additional airflow restricted areas through which the route extends, the allocation unit configured to decrease the derating speed for smaller separation distances and to increase the derating speed for larger separation distances; or
- a grade of the route that exits from the airflow restricted area along the direction of travel of the vehicle system, the allocation unit configured to decrease the derating speed for smaller grades and to increase the derating speed for larger grades.

28. A method comprising:
responsive to a trailing propulsion-generating vehicle in a vehicle system derating during travel in an airflow restricted area, changing a distribution of a total power output of the trailing propulsion-generating vehicle and at least a leading propulsion-generating vehicle in the vehicle system as the vehicle system travels in the airflow restricted area, wherein the trailing propulsion-generating vehicle travels behind the leading propulsion-generating vehicle in the vehicle system along a direction of travel of the vehicle system; and
controlling a rate at which the power output generated by the trailing propulsion-generating vehicle decreases due to derating during travel of the vehicle system in the airflow restricted area by limiting the power output that is generated by the trailing propulsion-generating vehicle, wherein the rate is based on one or more of:
- a distance that a route being traveled by the vehicle system extends through the airflow restricted area;
- a separation distance between an exit of the airflow restricted area and an entrance of one or more additional airflow restricted areas through which the route extends; or
- a grade of the route that exits from the airflow restricted area along the direction of travel of the vehicle system.

29. A system comprising:
one or more processors configured to, responsive to a trailing propulsion-generating vehicle in a vehicle system derating during travel in an airflow restricted area, change a distribution of a total power output of the trailing propulsion-generating vehicle and at least a leading propulsion-generating vehicle in the vehicle system as the vehicle system travels in the airflow restricted area, wherein the trailing propulsion-generating vehicle travels behind the leading propulsion-generating vehicle in the vehicle system along a direction of travel of the vehicle system, the one or more processors also configured to control a rate at which the power output generated by the trailing propulsion-generating vehicle decreases due to derating during travel of the vehicle system in the airflow restricted area by limiting the power output that is generated by the trailing propulsion-generating vehicle, wherein the rate is based on one or more of:
- a distance that a route being traveled by the vehicle system extends through the airflow restricted area;
- a separation distance between an exit of the airflow restricted area and an entrance of one or more additional airflow restricted areas through which the route extends; or
- a grade of the route that exits from the airflow restricted area along the direction of travel of the vehicle system.

\* \* \* \* \*